United States Patent [19]
Hunter

[11] Patent Number: 6,018,735
[45] Date of Patent: Jan. 25, 2000

[54] NON-LITERAL TEXTUAL SEARCH USING FUZZY FINITE-STATE LINEAR NON-DETERMINISTIC AUTOMATA

[75] Inventor: Kenneth M. Hunter, San Francisco, Calif.

[73] Assignee: Canon Kabushiki Kaisha, Tokyo, Japan

[21] Appl. No.: 08/918,503

[22] Filed: Aug. 22, 1997

[51] Int. Cl.[7] .................................................. G06F 17/30
[52] U.S. Cl. ..................... 707/5; 707/3; 707/4; 706/2; 706/23
[58] Field of Search ............... 707/3, 5, 4, 102, 707/103, 532; 382/229, 306, 177, 209, 228, 226; 364/222, 226, 717; 706/20, 8, 5, 2, 23

[56] References Cited

U.S. PATENT DOCUMENTS

| | | | |
|---|---|---|---|
| 5,099,425 | 3/1992 | Yuji et al. | 704/9 |
| 5,138,669 | 8/1992 | Shimura et al. | 382/37 |
| 5,600,835 | 2/1997 | Garland et al. | 707/5 |
| 5,606,690 | 2/1997 | Hunter et al. | 707/5 |
| 5,610,812 | 3/1997 | Schabes et al. | 704/9 |
| 5,825,943 | 10/1998 | DeVito et al. | 382/403 |
| 5,943,659 | 8/1999 | Giles et al. | 706/2 |

OTHER PUBLICATIONS

Sun Wu and Udi Manber; *Fast Text Searching Allowing Errors; Communcations of the ACM;* Oct. 1992, vol. 35, No. 10; pp. 83–91.

Udi Manber and Sun Wu; Approximate String Matching With Arbitrary Cost For Text and Hypertext; Department of Computer Science University of Arizona; Feb. 1990; pp. 1–11.

John E. Hopcroft and Jeffrey D. Ullman, Introduction to Automata Theory, Languages, and Computation; 1979; pp. 13–29.

H. J. Schek; Tolerating Fuzziness in Keywords by Similarity Searches; Kybernetes 1977, vol. 6; pp. 175–184.

*Primary Examiner*—Wayne Amsbury
*Assistant Examiner*—Thu-Thao Havan
*Attorney, Agent, or Firm*—Fenwick & West LLP

[57] ABSTRACT

Method and system for selectively retrieving information contained in a stored document set using a metric-based or "fuzzy" finite-state non-deterministic automation. The system receives a generalized regular search expression from a user. The system then performs prematching during which it estimates a dissimilarity metric for each target string in the stored document set with respect to the search expression. The strings are then sorted by dissimilarity metric, with the best matches, i.e., the strings having the lowest dissimilarity metrics, first. The search expression is broken down into one or more segments. A linear fizzy finite-state non-deterministic automation is constructed (501) by matching each segment of the search expression with a corresponding set of states and transitions. The automation is initialized and then processes target strings read (502) from the sorted list, thereby generating a dissimilarity value for each target string. A dissimilarity value for each string is determined based upon penalties associated with one-to-one fuzzy character substitution, exchanged adjacent characters, one-to-many, many-to-one, and many-to-many character substitution, and other differences between the search expression and a target string read from storage.

32 Claims, 22 Drawing Sheets

NON-LITERAL TEXTUAL SEARCH USING FUZZY FINITE-STATE LINEAR NON-DETERMINISTIC AUTOMATA

RELATED APPLICATIONS

This application is related to U.S. Pat No. 5,606,690, entitled NON-LITERAL TEXTUAL SEARCH USING FUZZY FINITE NON-DETERMINISTIC AUTOMATA, which issued on Feb. 25, 1997, and is hereby incorporated by reference herein.

This application is related to commonly owned U.S. Pat. No. 5,825,943, entitled SELECTIVE DOCUMENT RETRIEVAL METHOD AND SYSTEM, which was filed on Sep. 29, 1995, and is hereby incorporated by reference herein.

BACKGROUND OF THE INVENTION

1. Field of the Invention

The present invention relates generally to the field of document storage and retrieval systems of the type used for multiple document manipulation. Specifically, the invention relates to a method and system for selectively searching and retrieving information from stored documents using a non-literal search strategy employing metric-based or "fuzzy" finite-state non-deterministic automata.

2. Description of Related Art

Electronic storage of documents has facilitated the handling of large volumes of documents, such as those handled by hospitals, universities, government institutions, and the like. Typically, the documents are entered into massive storage systems by various means, including direct typing, receipt of electronic mail, and scanning. Scanning systems often utilize optical character recognition (OCR) that converts text portions of scanned images into electronic data. Stored documents thus may contain mixtures of images, text, and annotations such as key words, and may be stored in various electronic forms. Selective retrieval of information from the stored document set poses significant problems due to the volume of information to be searched.

Existing archival and retrieval systems support a variety of search technologies. These include automatic or user defined indexing, key word annotation, automatic key word extraction, full text search, preprocessed indexing of some or all words or phrases in the text, and both literal and non-literal searches.

Typical existing systems assign an index to each document as it is entered into storage. The index may be a system-generated or a user-defined code associated with each document. The code then is stored together with the document. To retrieve a document, a user must enter the appropriate code associated with the desired document. Other systems use key words in a similar manner. There are many methods for identifying and assigning key words to a document, including direct keyboard entry by the user, interactive selection from the document text by the user, and automated extraction by a search of the document text. Once key words have been assigned to documents, the user may then use them to retrieve a document. Two problems encountered with such systems are that a user (1) can retrieve only entire documents, and (2) must know the index, code, or key words associated with a desired document.

Full text search systems permit users to access selected information from a document set by entering a search term into the system. The system then reads through the entire document set to find an exact match for the entered search term. This has the benefit of locating particular instances of strings within the document text. Full text-search systems facilitate features such as proximity searching, where the search expression may contain restrictions on the relative locations of document set text strings that match certain portions of the search expression. The problem encountered with such systems is that each search involves a complete pass across the entire document set text, which makes such searches slow for very large document sets.

Preprocessed, or indexed, search systems typically create tables of words found in the document set text. These tables greatly increase the efficiency of searches over large document sets. For example, in a very simple embodiment, the search is initially performed over the tables, and then only for documents that the tables indicate contain desirable target words. The tables can be sorted and cross-indexed in various standard ways to optimize performance in specific situations.

However, for both full text and indexed search systems, in some instances there may be a mismatch between the search term and the term in the document set. For example, a user may enter a wrong or unintended search term, such as by making a keyboarding or other error when entering the search term. As another example, there may be an error in the original text, OCR, or manually entered key word. Literal search systems that require exact matches are incapable of handling such mismatches between entered search terms and document set text, and would be unable to retrieve a desired document in such cases.

A non-literal, or "fuzzy", search system is capable of handling mismatches. Use of such a system involves entering a text string into a computer system and then searching for a "close" match of that text string in a stored text file. For example, a user may request a search on "receive" (spelled incorrectly), and the system may find the correctly spelled word "receive". In another example, if the stored text file is obtained from OCR of an optically scanned document, often the OCR system misrecognizes characters that are typographically similar. The letter "O" may be misrecognized as the numeral "0", or the letter pair "rn" may be misrecognized as the single letter "m". In these instances, it would be desirable to retrieve text that is typographically close to the input text string.

Known fuzzy search techniques are not well adapted to the task of finding documents containing words "close" to search terms. For example, a technique described in R. Baeza-Yates and G. Gonnet, "A New Approach to Text Searching", COMMUNICATIONS OF THE ACM 35, 10 (October 1992), 74–82, finds matches between a target word and a search term where the target word contains mismatched characters, but does not describe a technique to successfully handle missing characters, extra characters, or exchanged adjacent characters. A second technique, described in S. Wu and U. Manber, "Fast Text Searching Allowing Errors", COMMUNICATIONS OF THE ACM 35, 10 (October 1992), 83–91, supports only the use of small integer costs associated with mismatched characters, missing characters, or extra characters, thereby severely restricting the ability to fine-tune these costs, such as is required in the situation in which adaptive fine-tuning of the costs is desirable. In addition, their technique supports exchanged adjacent characters only as a combination of a missing and an extra character, so that the cost for exchanged adjacent characters is found only as the sum of the costs for a missing character and an extra character. To perform a fuzzy search, the Wu and Manber technique involves performing a search first for matches with no errors, then with one error, and so forth until sufficient matches are found.

A third technique, also developed by U. Manber and S. Wu, is described in a paper "Approximate String Matching with Arbitrary Costs for Text and Hypertext" dated February, 1990, and included in August, 1992 in the IAPR Workshop on Structural and Syntactic Pattern Recognition, Bern, Switzerland, handles missing and extra characters. The authors note "one drawback of the algorithm is that it cannot handle substitutions; that is, we assume that the cost of replacing one character by another is the same as the cost of deleting the first character and inserting the second." A similar problem exists with regard to exchanged adjacent characters.

A fourth technique, described in U.S. Pat. No. 4,985,863 by Fujisawa et. al., 1991, uses finite deterministic automata to search only literally for exact matches, but encodes into the OCR document text alternative identities of characters for which OCR had little certitude. This reference provides no support for missing characters, extra characters, or exchanged adjacent characters, and provides no general support for mismatched characters.

While each of these techniques may be suitable for specific limited uses, they are inconvenient for general use in finding a text string based on a search term when the number and type of errors in the search term is unknown. This limitation becomes especially acute as the number of distinct words in the document set grows very large.

Finite state automata have known uses in computer systems to parse a series of symbols to determine whether they match a specified pattern, where the symbols being analyzed are members of a finite symbol set, such as ASCII character codes. An automation starts operation from an initial state or art initial set of states, and then sequentially processes an incoming stream of symbols. As each incoming symbol is processed, the automation undergoes a change of state or states, depending on the previous state or states of the automation and the identity of the incoming symbol. If and when the automation reaches a terminal state just as the last of the incoming symbols is processed, the incoming stream of symbols is found to match a particular pattern that the automation was constructed to identify. Otherwise, the stream is found not to match any of the patterns that the automation was constructed to identify.

Automata may be either deterministic or non-deterministic. In a deterministic automation, at each point in time, the automation has a single current state, and there is a particular symbol which is going to be examined next. In the easiest cases, the result of processing that next symbol is that the automation is put into a single successor current state, which may be the same state but in any event is completely determined by the predecessor state and the input symbol. This process continues until all the symbols have been processed, a terminal state has been reached, or an incoming character is received for which there is no valid transition.

Depending on the design of the deterministic automation and the succession of states and input symbols, there may arise cases where there is more than one viable next state. Since only one state may be current at one time, the automation is copied as many times as there are viable next states, and each copy follows a different path through the sequence of states and next symbols. This tree of state sequences can have very large fanout, leading to great inefficiencies in processing. Even with backtracking, the process is fundamentally inefficient. The various sequences of successor states are exhaustively searched, one at a time, using backtracking whenever a particular path of states does not ultimately lead to a terminal state. As the tree of state sequences that needs examination grows, the amount of time required to perform such searching increases.

Deterministic automata are usable for such searching for small sets of known patterns, but are ill-suited for general use.

In a non-deterministic automation, multiple current states are permitted, and incoming symbols may result in a change from each current state to any of several successor states. When the end of the incoming symbol stream is reached, a search is made to determine whether any of the current states of the automation is a terminal state. If so, the incoming stream is found to match at least one of the patterns, although there may be no way to tell which particular pattern was matched.

There remains a need for an efficient general method and system for selectively retrieving information from a document set based on a potentially incorrect search term, and there remains an opportunity to apply finite-state non-deterministic automata technology to non-literal searching.

SUMMARY OF THE INVENTION

The present invention is a method and system for selectively retrieving information contained in a stored document set using a non-literal search strategy that employs metric-based or "fuzzy" finite-state non-deterministic automata.

The system includes at least one data input device (104) for transmitting a user-defined generalized regular search expression to a processor (102). Stored words (460), or strings, are compared to the search expression in order to calculate a preliminary estimate of dissimilarity between each word and the search expression. Then, the stored words (460) are sorted by estimate of dissimilarity using a high-speed sorting algorithm.

The search expression is divided into one or more segments by a finite-state deterministic automation. Then, a corresponding sel of state transitions for each segment is determined. The states and transitions for each segment are combined to form a linear finite-state non-deterministic automation (450) corresponding to the search expression. The automation is initialized. Next, stored words (460) are applied to the automation (450) in the sorted order with best matches first. The automation generates a dissimilarity value for each stored word. If the user is seeking to determine the best N matches, a priority queue is used to store the best N matches found as the stored words (460) are processed. An output device (470) provides a user, other data input device data file, or any combination therein with a sorted list of matching stored words, i.e., stored words having dissimilarity values below a threshold value, the N closest matching terms, or up to the N best matching terms having dissimilarity values less than or equal to a threshold.

In one aspect of the invention, the system determines dissimilarity values by using a fuzzy finite-state non-deterministic automation to calculate the minimum sum of the penalties associated with changes that could be made in a word under examination to make it match a search expression. Such changes include insertion of a character, removal of a character, exchanged adjacent characters, one-to-one, one-to-many, many-to-one, and many-to-many character substitutions.

The present invention further includes a method incorporating the functions of the described system. The invention is further described in the following detailed description and figures.

DETAILED DESCRIPTION OF THE PREFERRED EMBODIMENTS

Figure 1:
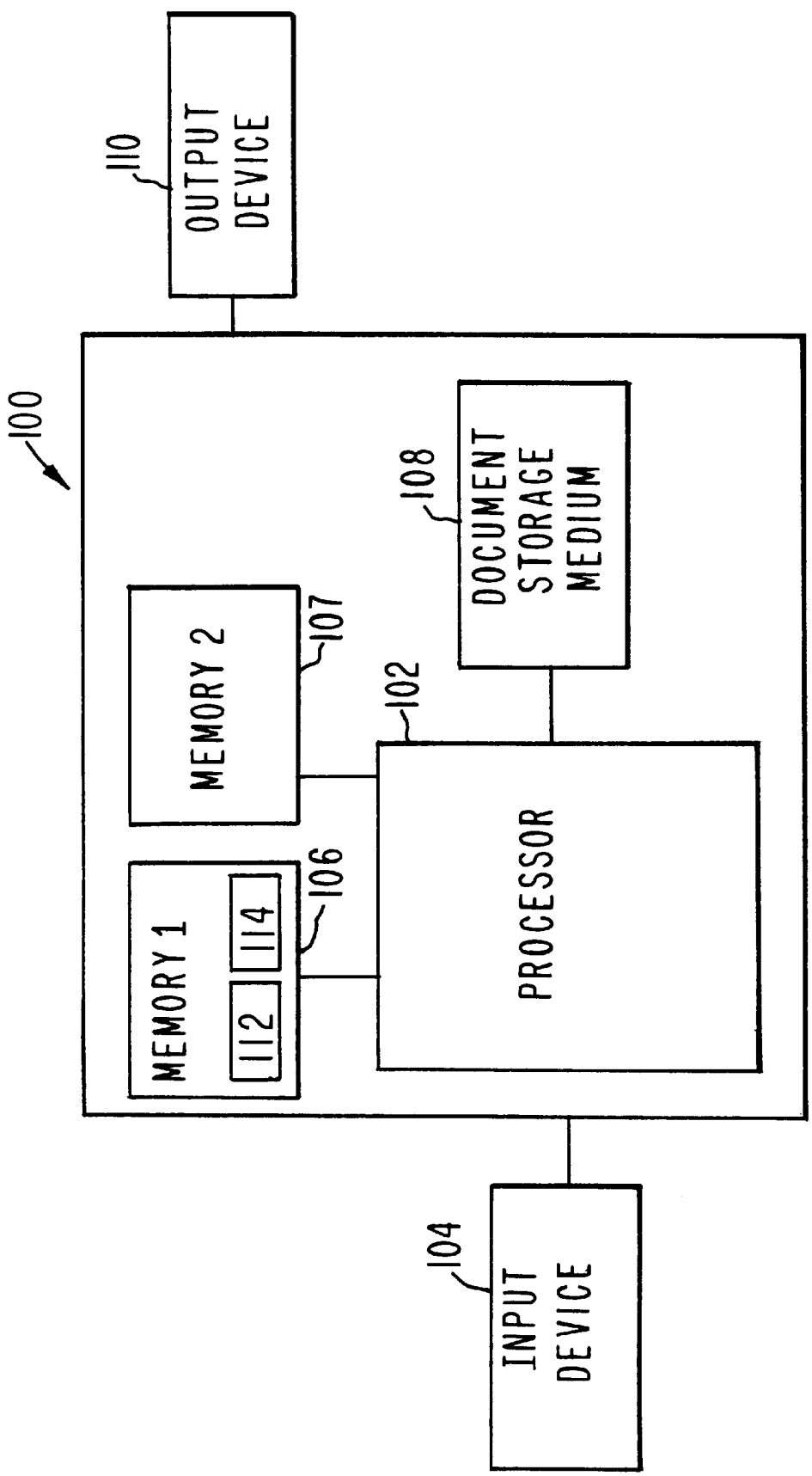
FIG. 1 shows a block diagram of an embodiment of the present invention.

The present invention relates to retrieving words or other information from a document set or other data set stored on a computer. A user may wish to retrieve a document, or a portion of a document, based on a search term. However, for a variety of reasons, there may be a mismatch between the search term entered by the user and the desired corresponding text string in the document set. The present system and method enable retrieval of a variety of "close" text strings from a document set based on the entered search term, and provides the retrieved text strings in an order that reflects an adaptive aspect of the system. This retrieval is accomplished using a finite-state non-deterministic automation.

One problem in designing such non-literal search systems is in defining how "close" a word in the document set must be for it to be considered a match with the search term. The present invention addresses that problem by solving a related problem: given a set of rules and associated "penalty" values for making specific changes in a word, determine the least total penalty for using those rules to change a word in the document set so that it would be identical to the search term. That minimal penalty value is then taken as the distance between the word and the search term. All words in the document set may then be ranked according to their distance from the search term. The words with the least distance are then deemed the "closest" to the search term, and provided accordingly. Fuzzy finite-state non-deterministic automata of the instant invention provide an efficient means of calculating such minimal penalty distance measures arising from such rule sets.

There may be many rules in the rule set. Such rules include "different symbol", the substitution of one symbol for another; "extra symbol" and "missing symbol", the addition and deletion of symbols; "exchanged adjacent symbols", swapping the ordinal positions of two neighboring symbols in a word, and "one-to-many", "many-to-one", and "many-to-many" symbol substitution. For example, a mismatch between document set words and search term might arise when a user intends to search on the term "monkey", but instead types in "mankey" or even "makney". The rule set described then provides the means for changing the document set word "monkey" to either "mankey" or "makney" through various sequences of substitutions, deletions, additions, swaps and other rules.

Numerous types of rules are allowed in the rule set. Consequently, it is quite possible for there to be alternative rule sequences that achieve the same overall change in a document set word. For example, "monkey" can be transformed to "mankey" by a one-step process of substituting an 'a' for the 'o'. It can also be obtained in a two-step process by operating on the 'o' with a character deletion rule, and then inserting an 'a' with a character addition rule. While these examples all utilize single or neighboring character actions, multiple character and other complex action rules are included in the scope of this invention.

Each time a rule is used, its associated penalty value is accrued to the total penalty for all the changes so far made to a word. The penalty value of each rule can be independent of the values of other rules. Hence, there will generally be different accrued penalties for different rule sequences that could each achieve the desired conversion of one word to another. Continuing the above example, if the penalty for substituting an 'a' for an 'o' is 5, the penalty for deletion of an 'a' is 3 and the penalty for addition of an 'o' is 1, then there is less penalty accrued for performing the two-step conversion than for application of the single-step rule.

While there may be many rules, and many allowed sequences of the applications of those rules which can convert one word into another, there will exist a single minimal penalty value that must be accrued to use the rules to perform the conversion. There may be many equivalent sequences of rule applications that achieve that lowest penalty value for the conversion, or there may be a unique sequence of changes for that minimal value. But a minimal value will exist for any given set of rules, associated penalties, and pairs of words. That minimal value is then taken as the distance between the two words.

Turning to FIG. 1, the present system 100 includes at least one computer processor 102 that is in communication with at least one input device 104, such as a keyboard, at least one memory device 106, and at least one output device 110. The at least one processor 102 is in communication with at least one storage medium 108 containing a stored document set. The at least one storage medium 108 may be used to store information contained in a document set that is typed, scanned, entered using optical character recognition technology, or entered using any technology known and available to those skilled in the art of document storage.

In one embodiment of the present system, the at least one storage medium 108 and the at least one processor 102 are contained within a single housing, forming a self-contained system. In alternative embodiments, the computer system may contain multiple processors. In addition, the storage medium 108 may be located in a remote location, accessible by the at least one processor 102 via a network, cables, or other medium of transferring information. In other embodiments, the computer system may be a distributed environment, with processors, storage media, and memory not associated with each other except to the extent that each device is momentarily working on the same problem. Moreover, the input device may accept input from a human user, from data file, or from another computer system. Likewise, the output device may be, for example, a display screen, a storage device, or the input of another computer system.

Figure 2A:
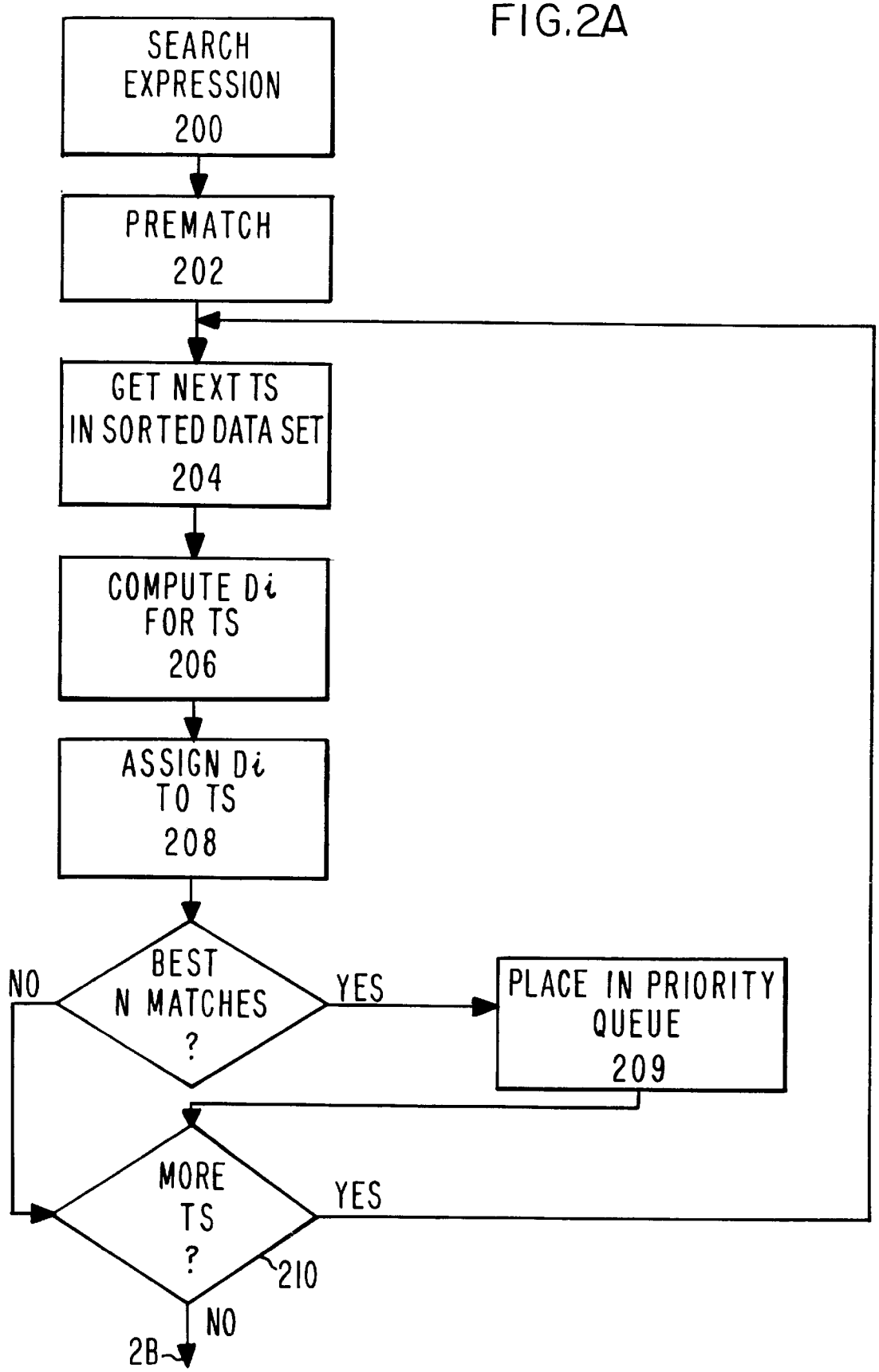
FIGS. 2A–2B depict flow charts showing, functional steps performed by the system.
Figure 2B:
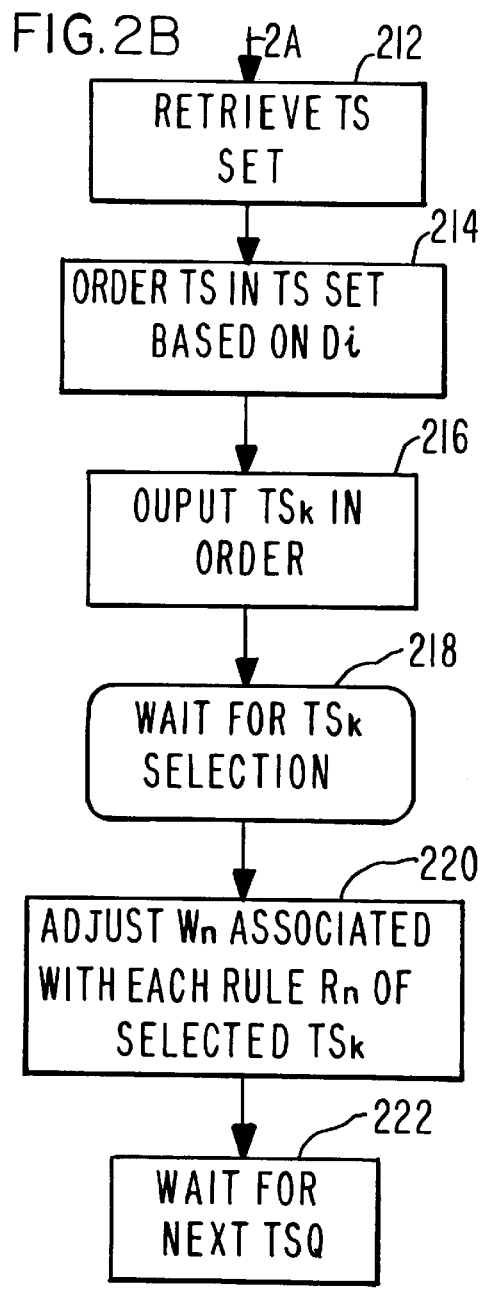
Figure 2C:
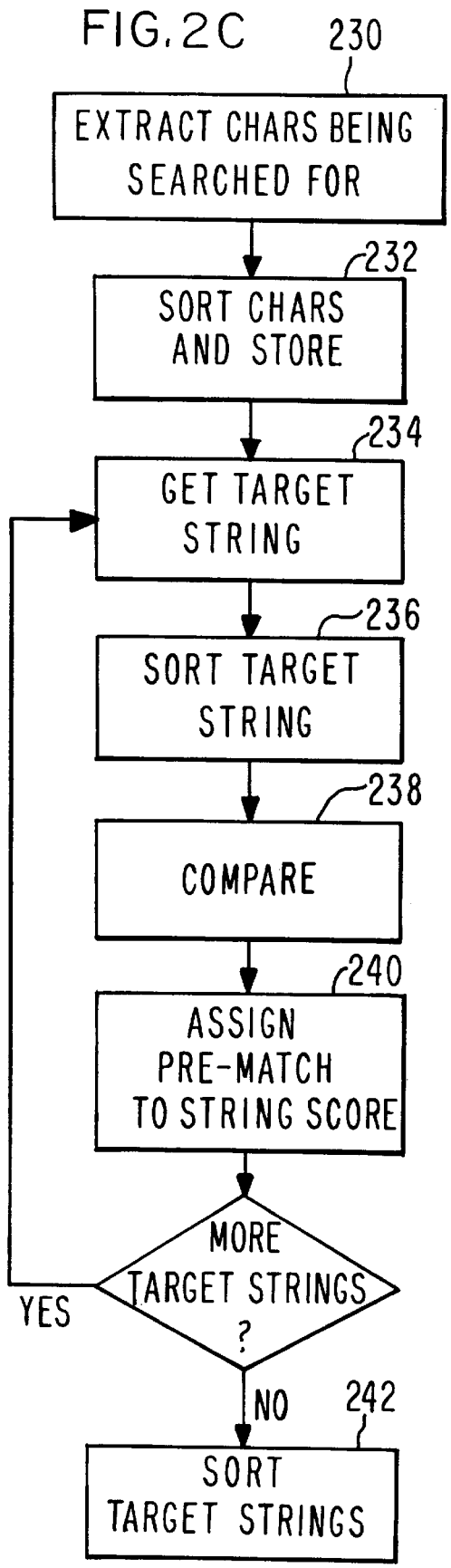
FIG. 2C depicts a flow chart of prematching according to one embodiment of the present invention.

FIGS. 2A–2C depict flow charts showing functional steps performed by system 100. The processor 102 receives a search expression 200 from the input device 104. The search expression may include one or more search terms, a phrase, or any other series of characters or single characters which a user requests from the document set stored in the document storage medium 108. In addition, the search expression may have expressed or implied Boolean operators.

At step 204, the system 100 examines each of the target words using a prematching algorithm. Prematching provides an estimate of how closely the search expression matches each target string. In general, the system 100 performs prematching by calculating a preliminary estimate of the measure of dissimilarity between the search expression of each of the target strings. The target strings are then sorted based on these preliminary estimates of dissimilarity.

FIG. 2C depicts a flow chart of how the system 100 estimates how closely a search expression matches a target string using prematching. At step 230, the system 100 extracts from the search expression the characters being searched for in each segment of the search expression. The system 100 disregards exactness specifications, quantifiers, wildcards, and segments in which a set of more than one character is specified. At step 232, the extracted characters are sorted into an ASCII order and stored in a string S. One embodiment of the present invention uses a variation of Quick Sort in which an Insertion Sort is used for short segments and medial values are estimated using a "best of 'N'" technique, to sort the string S. These sorting techniques are well known in the art. Further information about Quick Sort, Insertion Sort, and other sorting algorithms that can be used by system 100 is found in Gonnet, G. H. and Baeza-Yates, C., *Handbook of Algorithms and Data Structures in Pascal and C*, Addison Wesley, Second Edition, 1990, chapter 4, and Sedgewick, Robert, *Algorithms in C*, Addison Wesley, 1990, chapter 9, both of which are hereby incorporated by reference.

At step 234, a target string is retrieved from the target string set. Then, at step 236, the characters of the target string are sorted in ASCII order and stored in a string T. Once again, an embodiment of the present invention uses the above variant of Quick Sort to sort the target string T.

Next, at step 238, the two sorted strings, S and T, are compared. The system 100 performs this comparison by counting the characters; of each of the two strings that do not correspond to identical characters in the other string. If, for example, the search expression is "stop" and the target word is "post," each character of either word matches perfectly with a character of the other word, resulting in a prematch score of '0'. If, however, there are A characters in T that fail to match characters in S, and there are B characters in S that fail to match characters in T, then the prematch is calculated as A * the standard character deletion penalty+B * the standard character insertion penalty. The character deletion and insertion penalties are discussed in more detail below.

At step 240, the prematch score is assigned to the target string. This process repeats until each string in the target string set has an assigned prematch score. Then, at step 242, the target strings are sorted by prematch score, with those strings having the lowest score, i.e. the best matches, first. Because the strings are so ordered, the system 100 can more rapidly abort the evaluation of non-matching text strings when calculating the true dissimilarity values of the strings.

Of course, a variety of prematching algorithms may be constructed to approximate the match between the target string and the search expression. The algorithm discussed above operates rapidly and functions best when the search expression does not use quantifiers, wild cards, or sets of multiple characters in its segments. Other prematching algorithms may be more appropriate for such situations, or for cases where more accurate estimates of the match between a target string and a search expression are required.

Returning to FIG. 2A, the system 100 next processes the target strings, or target words, in the sorted list. At step 204, the system 100 gets the next target string in the sorted target string data set. A dissimilarity value $D_i$ is determined 206 and then assigned 208 to the document text string considered at step 204. There are several methods known and available to those skilled in the art which may be used to determine a dissimilarity value $D_i$. Thus, any method for determining a dissimilarity value $D_i$ may be incorporated into the inventive system.

In a preferred embodiment, the dissimilarity value $D_i$ is defined as:

$$D_i = \text{MIN}_1^k S r_n w_n \qquad \text{(Eq. 1)}$$

wherein $r_n$ is the number of times a particular rule $R_n$ from the first set of rules stored in memory 106 must be applied to the target string in coordination with the application of other rules to create a text string that matches the pattern specified by the search expression, k is the number of rules, $w_n$ is the non-negative weight assigned to each rule, and the minimization is performed over all possible sequences of rule applications that could successfully convert the document target string to match the pattern of the search expression.

The first set of rules stored in memory 106 is a set of manipulations that may be considered in the aggregate to modify the target string such that the target string matches the pattern specified by the search expression. Exemplary manipulations may include extra character, missing character, different character, exchanged adjacent characters, different case character/case sensitive, different case character/case insensitive, extra or missing prefix, suffix, or root characters. There are many additional rules that may exist and that may be used, including variations of these defined rules. These exemplary manipulations may be defined as follows:

"Extra character" means that the target string includes an extra character that is not part of the search expression. For example, while the search expression is for the word "misuse", the target string is the term "missuse". In that example, a single extra character "s" is included in the target string that does not appear in the search expression. Transforming the target string to match the search expression involves the deletion of a character of the target string and, therefore, the application of a character deletion penalty.

"Missing character" means that a character that is part of the search expression is omitted from the target string. For example, while the query is for the word "conscious", the target string is "conscious", or "conscious". Transforming the target string to match the search expression involves the insertion of a character into the target string and, therefore, the application of a character insertion penalty.

"Different character" means that a character that is part of the target string is used in place of a desired character. For example, while -the search expression specifies the word "bounce", the target string is "bounse", "bownce", and the like. In each of those examples, a non-matching symbol is to be replaced by a matching letter. Transforming the target string to match the search expression involves changing a character of the target string and, therefore, the application of a character modification penalty.

"Exchanged adjacent characters" means that adjacent characters in a target string are exchanged. For example, while the query is for the word "receive", the target string is "receive" Transforming the target string to match the search expression involves exchanging adjacent characters of the target string and therefore, the application of an adjacent character exchange penalty.

"Different case character/case sensitive" means that, in a case-sensitive search, the target string includes a mismatched case character. For example, while the search expression is "America", the target string is "america", without the initial capital "A". Transforming the target string to match the search expression involves changing the case of a character and, therefore, the application of a case change penalty.

"Different case character/case insensitive" means that, in a search where the case of the characters is relatively unimportant, the target string includes a character having a case that does not match its counterpart in the search expression. For example, a target string appears in all capital letters even though the search is case insensitive and the search expression may or may not include capital letters. Transforming the target string to match the search expression involves changing the case of characters and, therefore, the application of a case change penalty.

Variations on case sensitivity include case sensitive/insensitive for every letter in a word, case sensitive only for the initial letter (as in the example above), and case insensitive only for the initial letter but case sensitive for every other letter in a word. Case sensitivity also may depend on location with respect to stems, roots, prefixes, and suffixes.

Each of the rules defined above may be a single rule, or may represent a class of rules that address the same problem. For example, the rule "different character" may be a set of rules having one rule that assigns a penalty associated with the character "1" instead of the numeral "1", another rule that assigns a penalty associated with the character "O"instead of the numeral "0", and the like for OCR text. The set of rules $R_n$ are not necessarily exclusive, in the sense that "bounce" also can be obtained from "bounse" by the application of both the extra character rule, to yield "boune", and the missing character rule, to yield the target "bounce".

Other types of manipulations and search strategies that may be included as rules in the present system may include heuristic rules such as a thesaurus rule in which related words are found in a search, a phonetic rule in which phonetically equivalent, or nearly equivalent, words are found in a search, a language translation rule, and a prefix/suffix removal rule that finds all words having the same root. Rules may involve specification that a symbol or string of symbols in a search term are optional, or may be repeated, or may be either optional or repeated. A rule may support an extra or omitted hyphen, so that "auto-immune" and "autoimmune" would be treated as equivalent, or nearly equivalent. Since OCR processing often inserts extra spaces or deletes intended spaces, a rule may support the identification of "ofthe" and "of the" as equivalent, or nearly equivalent. Rules may support common spelling errors, such as using the wrong vowel, or spelling "photo" as "foto". Other rules known to those skilled in the art may be included in the rule set and are anticipated as being included in the rule set of the present system.

Penalties associated with rules may be smaller for characters which appear later in the incoming stream, or for transition to later states in a fuzzy automation. For example, it may be desirable to regard the strings "tilt" and "tills" as more similar to each other than the strings "tilt" and "stilt".

The next step 210 is a check whether there are additional target strings in the target word set to be considered. This loop of steps 204–210 continues, as shown in FIG. 2A, until each of the target strings in the document set has been assigned a dissimilarity value $D_i$.

In one embodiment, a concordance table or other index may be included in the system 100. In that embodiment, the concordance table points to selected target strings in the document set such that not all target strings are assigned a dissimilarity value $D_i$. In a preferred embodiment, the concordance tables provide indexed search capabilities, wherein each distinct string in the document set has a single entry in the table, each of which is assigned a value $D_i$, so that the much more numerous instances of those strings in the document set do not have to be assigned values directly.

The weight value $w_n$ associated with each rule initially may be some predetermined number. In one embodiment, all rules are given the same initial weight, and in another embodiment each rule is given a weight based on some expected weight. In one embodiment, the weight value $w_n$ is inversely related to some measure of the likelihood that the rule $R_n$ will generate a text match that will be selected by the user. Preferably, the weight value $w_n$ is a penalty value associated with each rule $R_n$.

The weight values $w_n$ may be user-specific or application-specific. For example, if a particular user is known to make typographic substitution errors in entering a search expression, the initial weight associated with that rule will reflect that tendency. For another example, in a document set that was obtained using OCR technology and stored in memory, a common mismatch may arise from the substitution of the numeral "1" for the letter "1", and vice versa. The weight values $w_n$ fbr such a common error initially may be set at some predetermined value based on historical data for the application of the character substitution rule for those OCR situations. In an alternative embodiment of the present invention, different rules may have the same weight value. The weight value also may be adjustable or determinable by the user. The weight associated with each rule is important for displaying the search result, as described in further detail below.

In the preferred system, the weight value $w_n$ its a penalty attributed to each rule. Each penalty may be attributed with an initial value, a range that may be based on the values of the weight of another rule or weights of a plurality of rules, plus various parameters to govern the manner and rate of adaptive change as described in further detail below. As described above, the penalty may be set to the same value for each rule or may be set to different values based on prior experience or projections of the relative importance of each rule.

In a preferred embodiment, the $D_i$ calculation 206 for any target string is stopped before it completes when it is determined that the value of $D_i$ will exceed a threshold value that may be a function of prior values obtained in the loop of steps 202–210 for other words in the stored document set. If the calculation is stopped, then that target string is given an arbitrarily large $D_i$ value, so that it will not be displayed 216.

Once all target strings are assigned 208 a dissimilarity value $D_i$, the next step 212 is retrieving a text string set. The retrieved document text string set contains location and other information associated with each instance of each of the target strings.

The system retrieves a text string set in accordance with a second set of rules stored in a memory device, such as device 107 of FIG. 1. These rules may include: retrieve only those text document strings having a dissimilarity value of zero (i.e., exact matches); retrieve all document text strings having the lowest dissimilarity value $D_i$; retrieve the first x number of document text strings having the lowest dissimilarity value $D_i$; retrieve only those document text strings having a dissimilarity value below x; retrieve all document text strings having the j lowest dissimilarity values $D_i$; retrieve one document text string having the lowest dissimilarity value $D_i$ per document; and the like. In one embodiment, the second set of rules may affect the $D_i$ values. Where appropriate, such rules may be applicable to text string instances in whole documents, specific sets of documents, or specific portions of one or more documents, depending on the scope and style of the search process.

For example, each document may have an associated penalty weight that is used to affect the $D_i$ values of all document text strings obtained from that document. The document weights may be fixed, may be determined by certain document data, or may be determined from user selections of retrieved text strings. Document weights may be uniformly applied to all instances of all text strings in that document, or may be made specific to the instances of each distinct document text string. For example, the penalty weight associated with a document may be derived from the number of text string instances in that document with dissimilarity values below x. In another example, the penalty weight associated with a document may be derived from the ratio of text string instances in that document with dissimilarity values below x, as compared to the total amount of text in the document. In cases where there is a penalty associated with each document, there may be another threshold value, y, which the resultant total penalty of each text string must not exceed in order to be retieved. Document weights may also be based on information contained in an index of system-generated or user-defined codes associated with each document.

In a preferred embodiment, the text string set contains a single entry for each distinct document text string occurring in each document. Multiple occurrences of possibly different text strings within a single document may contribute to the calculation of the document penalty weight for a given text string, but exactly one element is established in the retrieved text string set for each different text string which occurs in that document. The number of occurrences of that text string in the document, as well as the locations of each such instance within the document, and other information, are maintained in association with that single element of the set.

As a result, a single text string may have many distinct elements in the retrieved text string set, one element for each document in which the string occurs one or more times. In addition, there may be several distinct text strings, with different spellings, which "match" the text string query to within a desired threshold value, and so have distinct entries in the retrieved text string set for each document in which they occur.

In one embodiment, such penalty values, indices and retrieved text set entries may be associated with sets of documents or portions of one or more documents. In a preferred embodiment, the definition of a "document" is a directed acyclic graph comprised of pages and other documents which do not ultimately contain the defined document. In other embodiments, the smallest unit of inclusion may be a unit other than a page, such as a character, sentence or paragraph. Through this device, the second set of rules may be applied to the document set, based on any desired level of granularity in the retrieved text string set.

In a preferred embodiment, the retrieved text strings then are ordered 214 based on the dissimilarity value $D_i$ associated with each of the text strings in the retrieved text string set. Preferably, the retrieved text string having the lowest dissimilarity value is prioritized over a text string having a higher dissimilarity value. A single retrieved text string may appear in the ordered list several times, if it occurs in different documents, depending on the rule from the second set of rules used to retrieve the text string from the document text strings. In one embodiment, all elements of the retrieved text string set which are for string occurrences within a single document are combined into a single entry for the purposes of display. The combined entry is given a dissimilarity value which is based on the individual dissimilarity values of the entries from which it was created. The manner in which combined metric values are obtained is discussed below.

In the special case wherein the system 100 is retrieving all document text strings having the N lowest dissimilarity values $D_i$, the system 100 builds and maintains a priority queue as it processes the target strings (step 209). As used herein, a priority queue is a data structure that may be used to manage a collection of objects, each object possessing a numeric value, so that as the objects of the collection are processed, one at a time, the N objects having the smallest values found so far can be identified at any time, and the N-th smallest value found so far can be readily obtained at any time.

A priority queue is constructed to hold a specific number N of objects. A priority queue is initially empty and objects are inserted one-at-a-time until either the priority queue is full or there are no more objects to be inserted. Before the priority queue if full (i.e., contains N objects), the object having the largest value can be retrieved since there are less than N objects in the queue, rather than the object having the N-th smallest value.

In determining whether an object should be inserted into a priority queue, or in managing the internal operations of the queue, it is frequently necessary to determine whether one object (i.e., a target string) has a smaller dissimilarity value than another. Calculation of dissimilarity metrics for target words may result in ties, especially when the metric is calculated as the sum of a small number of small integer penalties. Therefore, the priority queue must have a method for breaking ties. In one embodiment, when two target words have the same dissimilarity metric, the word that comes first in ASCII sequence is regarded as if it has a smaller dissimilarity metric. In another embodiment, the capital letters in each target word are converted to lower case, and then the word that comes first in ASCII sequence is regarded as if it has a smaller dissimilarity metric.

Whenever a new target string is encountered and its value is less than the N-th smallest value previously found, the target string having the N-th smallest value is removed from the priority queue and the new target string is added (step 209). Then, the target string now having the N-th smallest value is identified so that the system 100 can readily access it. Thus, if a user is interested in finding the 100 words in the target list that most closely match the search expression, the system 100 uses a priority queue to maintain the set of the 100 best-matching strings found to date as the system 100 examines the target strings one at a time.

An advantage of a priority queue is that it can keep track of the N-th smallest value previously encountered, as well as the N target strings having the smallest value, without having to maintain the N target strings in a sorted list. If a sorted array were used instead of a priority queue, the time required to insert a new target string into the array and to delete a string already in the array would be proportional to N. With a priority queue, this time is only proportional to log(N). Further information about priority queues is found in *Handbook of Algorithms and Data Structures in Pascal and C*, chapter 5, and *Algorithms in C*, chapter 11.

At step 216 the output device 110 provides the ordered retrieved text string set. The generated output is typically a display allowing the user to view the retrieved text string prior to retrieving an entire page or a portion of a page of the document set containing the retrieved text string. For example, in a medical records context, a user may wish to retrieve and view the stored medical record of a certain patient "Smith". Before retrieving the entire medical record for each patient named "Smith", and other variations on the name "Smith", the present system displays 216 a list of retrieved text strings located in the search. The display may contain some contextual information about instances of the name "Smith", as is commonly done in existing search systems. However, the output may be provided to a computer system or storage media for further processing.

The system waits 218 for the selection of a text string from the output device 110. This selection may be made by a user through the input device 104, which may include a keyboard, mouse, or touch screen. In an alternative embodiment, the selection is made automatically based on penalty values to facilitate automated report generation. Such a selection results in instructions being sent to another system that retrieves a portion of the document, which may include several pages, a single page, or a portion of a page, containing the selected text string. An exemplary system that may be used in conjunction with the present system is disclosed in commonly owned U.S. patent application Ser. No. 08/537,314, which is hereby incorporated by reference herein.

The weight values $w_n$ may be adaptive in nature. Accordingly, the next step 220 involves adjusting the weight value $w_n$ associated with each rule, or rules, associated with the retrieved text string $TS_k$ selected from the display. For example, in one embodiment, if a user selects one of the displayed text strings $TS_k$, the penalty weight associated with each of the rules that was invoked at steps 204–206 may be decremented or otherwise adjusted. As the system continues to be used, the weight associated with each rule $R_n$ of the selected text string is adjusted a small amount up or down in such a manner that the system adapts to both the user and the application environment. This may be achieved by effectively "rewarding" rules that are successful in finding close matches that ultimately are selected by the user, e.g., by decreasing their associated penalty weights, to achieve a basis for discriminating among the rules based on an adjustment of the weight values.

In a preferred embodiment, the weight values $w_n$ associated with every rule $R_n$ of the rule set are adjusted. In other embodiments, only the weight value $w_n$ associated with the rules $R_n$ used in retrieving the selected text string $TS_k$ are adjusted. In yet another embodiment, the weight values $w_n$ associated with selected ones of the rules $R_n$ are adjusted. The specific manner in which the weight values $w_n$ are adjusted depends on the particular embodiment of the invention. Preferably, the system retains the adjusted weight values in memory so that for each subsequent search the adjusted weight values are applied in accordance with the use of their respective rules. Thus, at the step 208 of assigning a dissimilarity value $D_i$ to each text string in a document set, that value $D_i$ is determined based on the adjusted weight values from previous searches.

The objective of the adjustment of weight values is to arrive at new weights $w_n$ in such a manner as to discriminate between the text matches that the user selects and those which the user does not select. A preferred method, referred to as a perturbation method, determines and uses a measure of correspondence C to adjust the weights $w_n$ of all the rules in the first set of rules. According to the perturbation method, the weights associated with each of the various rules $R_n$ may either be incremented or decremented in such a way as to increase C. The measure of correspondence C determined in practicing the present invention may be expressed as:

$$C = \overline{D}_m - \overline{D}_i \qquad (\text{Eq. 2})$$

wherein $D_m$ is the mean dissimilarity value associated with non-selected text strings m, and $D_i$ is the mean dissimilarity value of selected text strings. As described above, each text string in the document set typically has an associated dissimilarity value.

Figure 3:
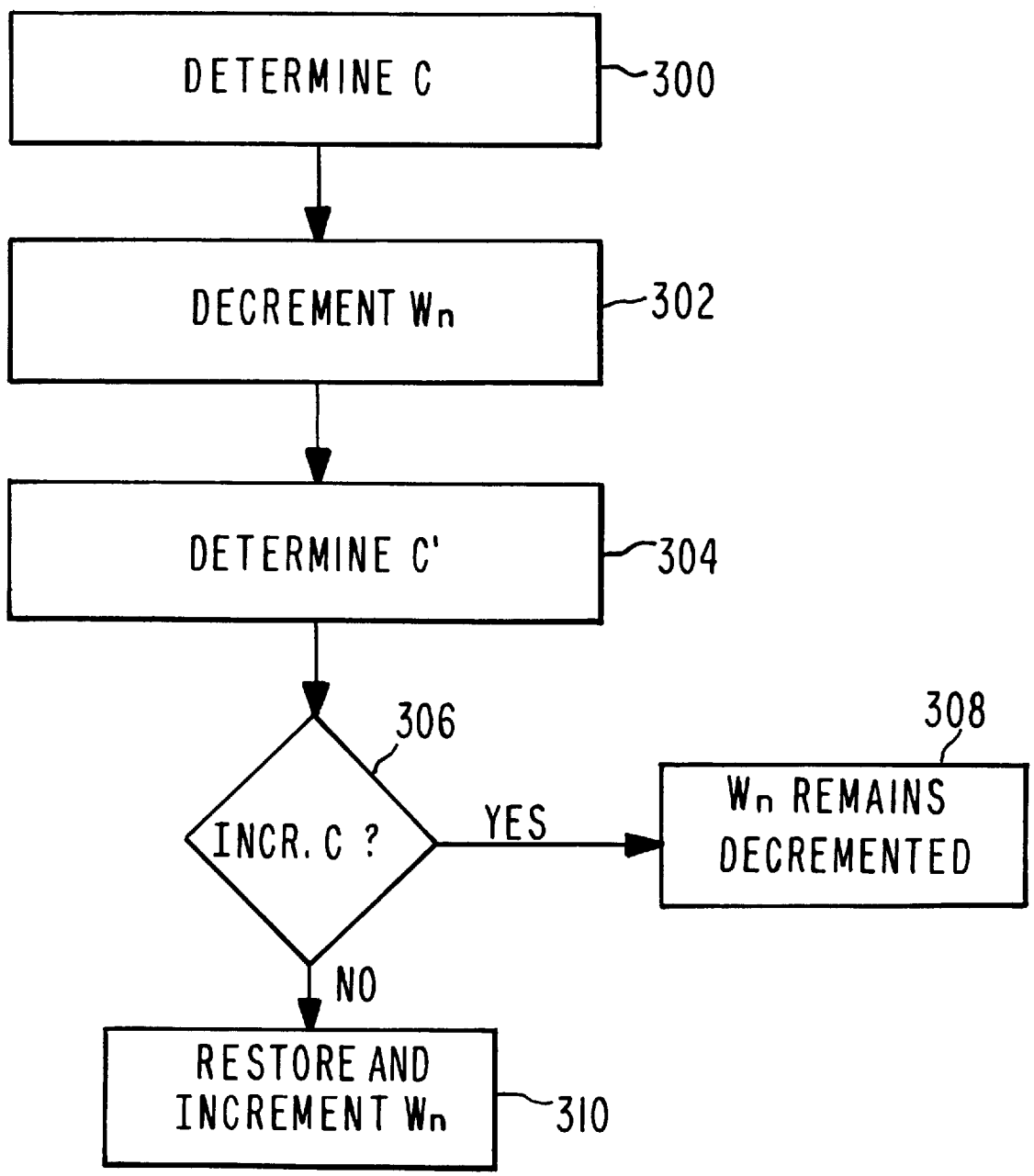
FIG. 3 depicts a flow chart of one embodiment of the present invention relating to determining an adaptive measure of association.

FIG. 3 is a flow chart of a preferred system for performing the perturbation method. As a first step 300, an initial measure of association C is determined, preferably in accordance with the algorithm stated above. This first step typically is taken after the user has made one or more selections from the set of retrieved text strings. In the next step 302 the weight $w_n$ associated with a single rule $R_n$ is decremented by a predetermined value. The value may be a constant, such as 1, or may be any selected number. The method of performing the decrement may be by subtraction, division, or other mathematical methods known and available to those skilled in the art. All other weights remain unchanged for purposes of performing this method. An adjusted measure of association C' is determined 304 using the decremented weight value $w_n'$. In the preferred embodiment, this determination 304 is made in accordance with the algorithm defined above.

In the next step 306 the system checks whether the adjusted measure of association C' determined in step 304 has increased over the initial measure of association C determined in step 300 prior to the decrementing step 302. If C' is increased over C, then the weight value $w_n'$ remains 308 the decremented value. However, if C' is not increased over C, then the weight value $w_n'$ is returned to its original value $w_n$, and then $w_n$ is incremented 310 by some predetermined value . The steps of 300 through 310 may be performed individually for the weight associated with each rule in the present system. The method of performing the increment may be by addition, multiplication, or other mathematical methods known and available to those skilled in the art.

Optionally, the measure of association C may be recalculated after step 310 or otherwise checked against C to verify an improvement. The illustrated system of FIG. 3 may alternatively be performed by initially incrementing the weight value $w_n$, by checking for a decrease in C rather than an increase in C, or both. The perturbation method is performed to increase the measure of correspondence. In practicing the invention including performing perturbation on the weights and rules, the system strives for separation between the dissimilarity value $D_i$ of selected text strings and the non-selected text strings. Other methods of determining C may be used.

The system may further include some selection preference value $s_q$ associated with each text string. The selection preference value $s_q$ may be a binary number designating whether or not a particular text string TS has been selected. In a preferred embodiment, the selection preference variable $s_q$ is assigned a value of 0 if the match is selected by the user, and 1 if it is not selected by the user. Alternatively, the user may prioritize the retrieved text strings, assigning numeric values (not restricted to 0 or 1) to indicate preferences among the close matches In that embodiment, a lower numeric value indicates a greater interest in a particular close match (e.g., 1 indicates first choice, 2 indicates second choice, etc.)

In alternative embodiments, an appropriate measure of correspondence C may be determined in any of several ways as: the Pearson product moment coefficient of correlation between the dissimilarity values $D_i$ and the selection preferences $s_q$; the reciprocal of the probability of the Pearson product moment coefficient of correlation computed under the null hypothesis that there is no correlation between the distances and the selection preferences; negative one multiplied by the probability of the Pearson product moment coefficient of correlation computed under the null hypothesis that there is no correlation between the distances and the selection preferences; the Spearman rho rank-order coefficient of correlation between the dissimilarity values $D_i$ and the selection preferences $s_q$; or, the reciprocal of the probability of the Spearman rho rank-order coefficient of correlation computed under the null hypothesis that there is no correlation between the dissimilarity value $D_i$ and the selection preferences $s_q$.

In one embodiment, after the weights $w_n$ have been restored and incremented at step 310 or decremented at step 308, the weights $w_n$ may be normalized. Normalization may be carried out to prevent the values of the weights from becoming too large or too small for precise calculation, and to ensure that dissimilarity values $D_i$ determined after separate queries have comparable values.

Normalization may be applied to the entire set of weights, or to subsets of weights corresponding to categories of related rules $R_n$. For example, weights associated with the substitution of typographically similar characters might constitute a subset of weights normalized separately from other weights Normalization may include one or more of the following steps: adding a quantity to the weight $w_n$ associated with each rule in a set to achieve a fixed mean or other measure of central tendency; multiplying the weight $w_n$ associated with each rule in a set by a quantity to achieve a fixed mean or other measure of central tendency, or to achieve a fixed standard deviation or other measure of dispersion; adding a quantity to the weight $w_n$ associated with each rule in a set in order to maintain a particular weight in the set at a fixed value; or multiplying the weight $w_n$ associated with each rule in a set by a quantity in order to maintain a particular weight at a fixed value.

Figure 4:
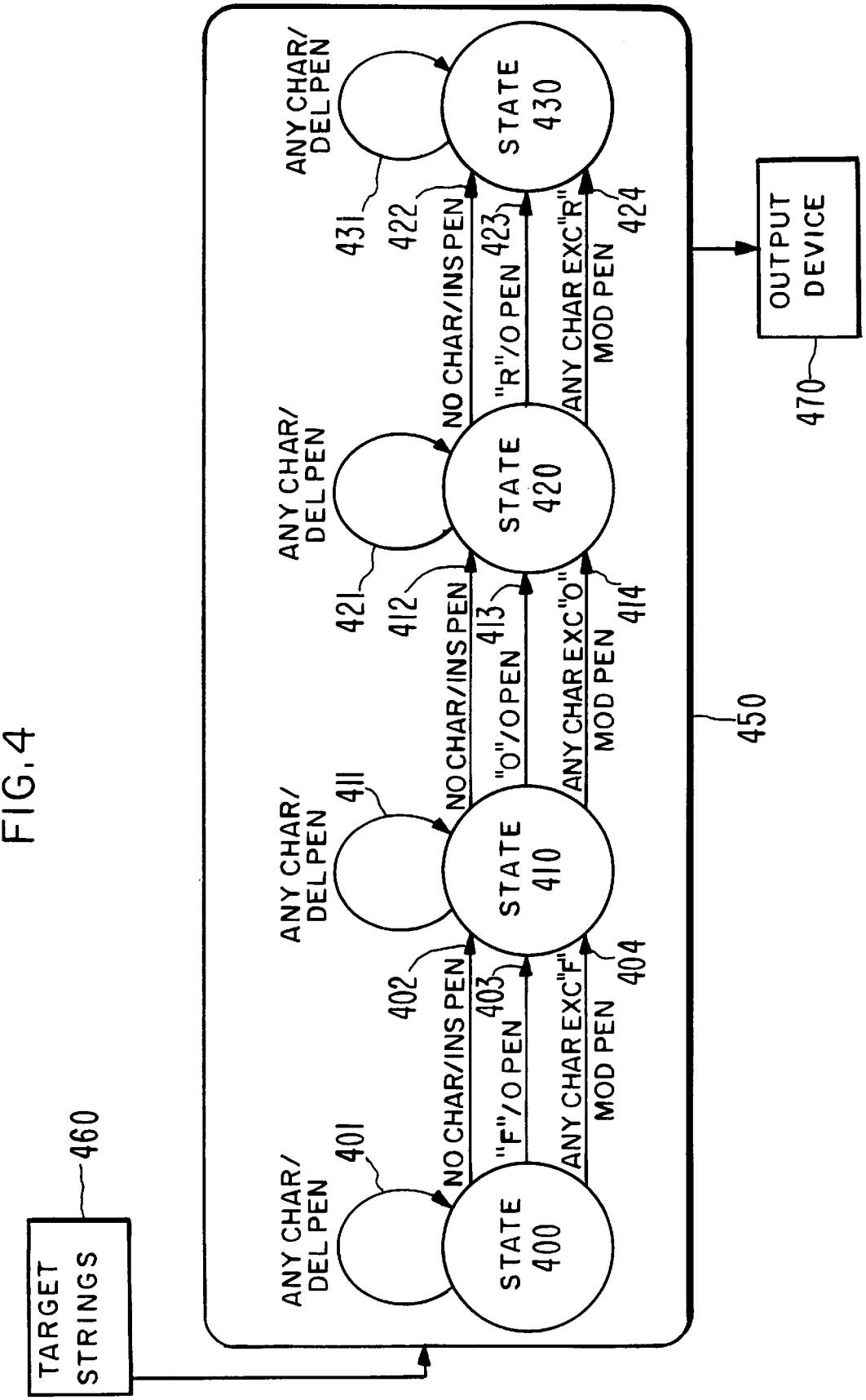
FIG. 4 shows a state diagram of a linear finite-state non-deterministic automation in accordance with the present invention.

Referring now to FIG. 4, there is shown a state diagram depiction of a finite-state non-deterministic automation 450 in accordance with the present invention. Automation 450, along with other aspects of the present invention disclosed herein, is implemented in a preferred embodiment by a computer program stored in memory, e.g., 106, and controlling the operation of CPU 102. The particular automation 450 illustrated in FIG. 4 is designed specifically for the retrieval of a certain English word, i.e., "for", but it should be apparent that state machines for retrieval of other words or phrases, or for other types of symbols, may readily be constructed either manually or automatically. A database of stored words 460, also called "target strings," such as may be found in document storage medium 108 of FIG. 1, are applied to automation 450. The results of processing by automation 450 are applied to search list display 470, which produces a visible or other indication of which of target strings 460 most closely resemble the search term for which automation 450 was constructed. In one embodiment, search list display 470 is implemented in a conventional manner by programming CPU 102 of FIG. 1.

Figure 5:
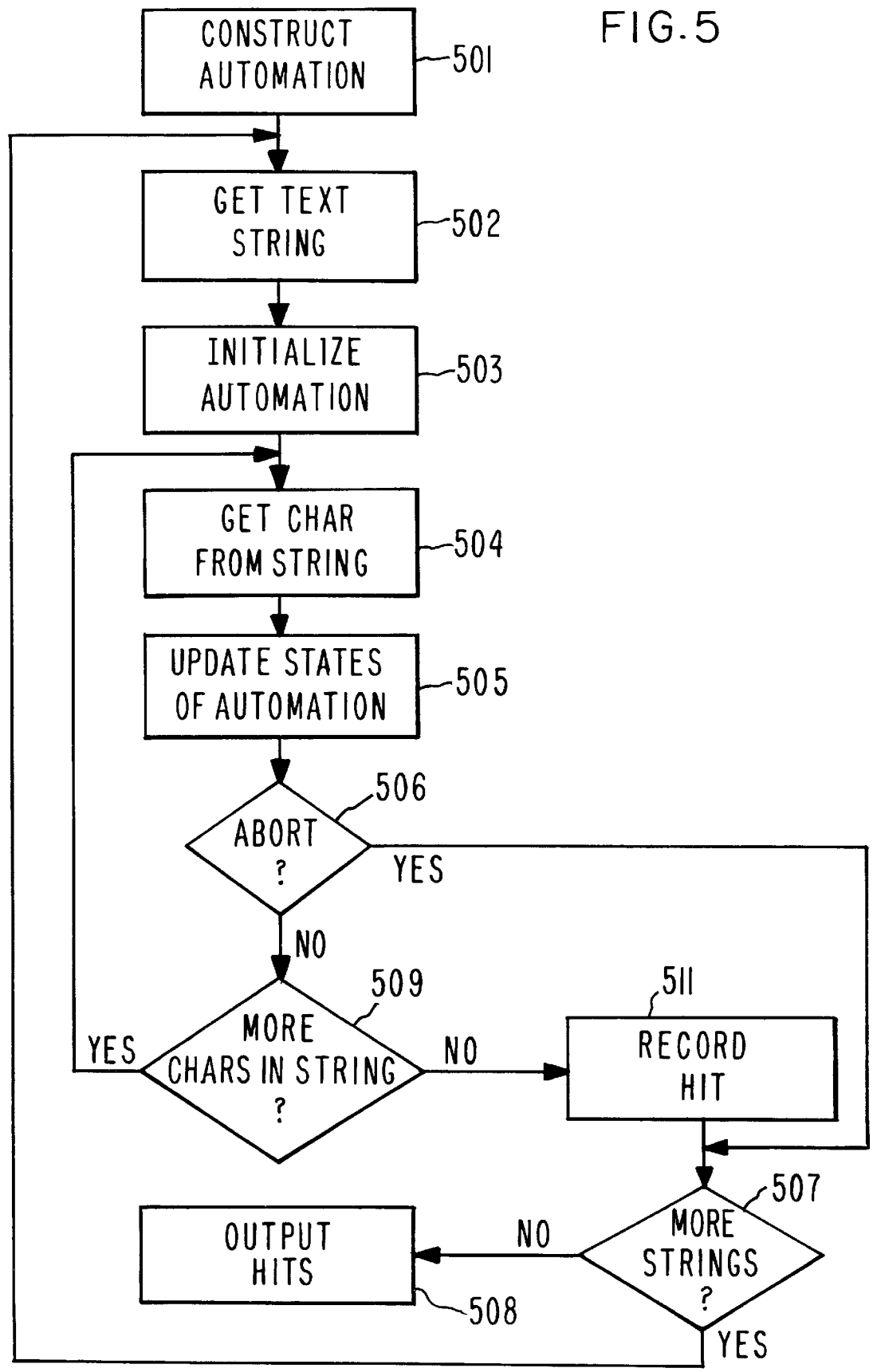
FIG. 5 depicts a flow chart of processing using an automation in accordance with the present invention.

Referring now also to FIG. 5, there is shown a flow diagram of the steps performed by an automation, e.g., 450, when processing a database of stored target strings 460 and outputting a hit list 470. First, an automation such as 450 is constructed 501 for a desired search expression. It is apparent from the description below how such an automation 450 may be constructed. Next, a target string is obtained 502 from storage 460. The automation is then initialized 503 by assigning predetermined values to states of the automation, as described in detail below. A character from the target string is then obtained 504, and values of the states of the automation are updated 505 in response to that character, as is also described in detail below.

A check is then made 506 to determine whether processing of the string can abort. Whether processing of the string can abort depends on whether a threshold or best of N search is being performed. If a threshold search is being performed, then the evaluation of the target string aborts if the smallest value associated with any state of the automation 450 is greater than the threshold value. If a best of N search is being performed and at least N terms have already been evaluated, then the evaluation of the target string aborts if the smallest value associated with any state of the automation 450 is greater than the value associated with the Nth best matching target word previously found. If a best of N search is being performed but N terms have not yet been evaluated, then the evaluation of the target string does not abort. If combined threshold and best of N searches are being performed, then the evaluation of the target string aborts if the smallest value associated with any state of the automation is greater than the threshold, or is greater than the value associated with the Nth best matching target word previously found. Finally, if threshold and best of N searches are being performed and fewer than N target strings have already been added to the priority queue, then the evaluation of the target word aborts if the smallest value associated with any state of the automation is greater than the threshold.

If the evaluation of the target string is aborted, then a check 507 is made to determine whether there are more strings to evaluate. If there are more strings, then processing of the next target string 502 is performed. If there are no more strings, then the list of matching target strings is output 508.

If the evaluation of the target string is not aborted, then a check 509 is made to determine whether there are more characters left in the current target string. If so, processing returns to 504 to obtain the next character.

If all of the characters in the target string are processed without aborting, then the target string is recorded as a hit 511. If a threshold search was specified, then the string is stored in a sorted list of matching target strings. If a best of N search was specified, then the target string is stored in the priority queue and, if there are N or more strings already in the queue, the former Nth-best match is deleted from the queue.

Next, a check 509 is made to determine whether there are more target strings left to examine. If so, processing returns to 502 to obtain another string. If there are no additional strings to examine, the hits are output 508.

Generally speaking, finite-state automata include three types of states: initial states, intermediate states, and terminal states. Each state may be set either to an "on" status or an "off" status, with the state or states turned on at the beginning of processing being termed "initial states." The transition of an automation from one state to another depends on the identity of successive symbols from an input symbol set. For non-deterministic automata, more than one state may be current (i.e., set to "on") at any particular time.

Transition from one state to another is determined by a set of transition rules that specify the circumstances for changing the status of particular states. As each incoming character is processed, each of the rules is examined to determined which states are to be marked to be set "on". After this examination, each state marked to be set on is set on, and all other states are set to off. If at any time there are no states in the "on" status, the process is considered to have failed to identify any candidate matches.

A set of the states of such an automation is designated as a set of "terminal" states, i.e., states that, if reached, indicate that the incoming characters already processed match a pattern that the automation has been constructed to detect. If a terminal state is found to be set to "on" after the last incoming signal has been processed, the sequence of incoming symbols is deemed to constitute a pattern match for the pattern associated with the terminal state. Intermediate states are those which are neither initial states nor terminal states.

A preferred embodiment of system 100 uses linear automata. A linear automation: (1) has states arranged linearly; (2) has only one initial state and one terminal state; (3) has any intermediate states arranged sequentially between the initial state and the terminal state; and (4) permits transitions only (a) from a state to itself; and (b) from a state to the next state. In a linear automation, transitions from a state to an earlier state and transitions that skip over states are not permitted.

Turning now to automation 450, this automation is a linear finite-state fuzzy (or "extended" or "generalized") non-deterministic automation and does not include states that are set to be only either "on" or "off". Each state of automation 450 is associated with a metric to indicate its status. In a preferred embodiment, metrics are positive integers that range from 0 (the "on-most" status) to infinity (the "off-most" status). It should be recognized that other systems of metrics could be used as well.

In the notation of FIG. 4, a transition rule, e.g., 403, provides a transition from a first state, e.g., 400, to a second state, e.g., 410, if the character presently under examination is a specified character, e.g., "f", resulting in the second state being assigned a value equal to the value of the first state+0.

The "Any Char Exc 'f'" notation for rule 404 is applicable for any character other than 'f'. This rule provides a transition from a first state, e.g., 400, to a second state, e.g., 410, if the character presently under examination is not the specified character, e.g., 'f', resulting in the second state being assigned a value (equal to the value for the first state+a character modification penalty.

The "No Char" notation for rule 402 means that the rule 402 is applicable without any new character input. Such rules are applied (1) before the first incoming character has been processed, and (2) following the application of all other rules after an incoming character has been processed. This rule 402 provides a transition from a first state, e.g., 400, to a second state, e.g., 402, resulting in the second state being assigned a value equal to the value of the first state+a character insertion penalty.

The rule 411 permits a transition from a state, e.g., state 410 to itself for any character presently under examination, resulting in ihe state being assigned a value equal to its previous value+a character deletion penalty.

FIG. 4 shows four transitions into state 410, each permitting the assignment of a new value to state 410. The value actually assigned is the smallest of the values permitted by each of these four rules.

The words after the diagonal slashes in FIG. 4, such as "Ins Pen," "Mod Pen," and "Del Pen," indicate the magnitudes of the penalties applied for each corresponding transition and will be further described below. When a transition occurs from a first state to a second state, the new value of the second state is calculated as the sum of the value of the first state+the penalty.

When there are multiple applicable transitions into the second state, possibly from more than one first state, the value assigned to the second state is the smallest of the values dictated by the rules associated with the multiple transitions.

The states of a fuzzy non-deterministic finite-state automation are assigned a sequential order, such that there are no transitions from a later state to an earlier state. The states are numbered sequentially and, accordingly, if an automation contains N states, the states are numbered from 0 to N−1. Each time that an incoming character of the target word is processed, revised values are calculated for each state in the automation. A preferred way to calculate the state values is to use two state sets, each of which may be thought of as an array of state values.

As depicted in FIG. 5, operation of the automation involves (1) construction of the automation (step 501); (2) initialization of the automation (step 503); and (3) processing each of the incoming characters (steps 504–6).

At step 501, an automation is constructed for the search expression entered by the user. In a preferred embodiment of system 100, the search expression is a generalized regular expression. Regular expressions are extensively used in certain branches of computer science, such as pattern matching and compiler construction. Specifically, finite-state deterministic automata and finite-state non-deterministic automata are constructed from regular expressions used to identify patterns in the processing of character streams. For example, the reference INTRODUCTION TO COMPILER CONSTRUCTION by Thomas W. Parsons, Computer Science Press, 1992 (sections 2.6 "Regular Expressions", 2.7 "Regular Expressions and Finite-State Machines", and other sections), hereby incorporated by reference herein, explains and defines "regular expression", finite-state deterministic automation, and finite-state non-deterministic automation.

An expression is considered to be a "regular expression" for present purposes where: (i) zero, one, or more symbols or sequences of symbols are available to form such expressions; (ii) a "wild card" may be used to represent any of the possible symbols, or some specific subset of the possible symbols, such as numeric characters, a vowel, a numeral, or a capital letter; (iii) a symbol or sequence of symbols may be present once or repeated more than once; (iv) a symbol or sequence of symbols may be absent; or (v) a symbol or sequence of symbols may be absent, present once, or repeated more than once.

A preferred embodiment of system 100 uses a fuzzy generalization of regular expressions to construct fuzzy finite-state non-deterministic automata. By default, a generalized regular expression is treated as a request for a fizzy search. However, as in a generalized regular expression, the user is permitted to specify that a portion of the search expression is to be treated as exact.

According to a preferred embodiment of system 100, a generalized regular expression, or search expression, consists of one or more segments. Each segment, in turn, has three components. The first component is an exactness specifier. The exactness specifier specifies that the target character must exactly match the segment. In one embodiment of the present invention, the exactness specifier is "!".

The second component is a character or wildcard specifier. A search expression specifies a particular character by including that character in the generalized regular expression. In an embodiment of the present invention, the wildcard character, "_", is used to indicate any character. For example, the search expression "!a" matches only target strings having an "a" in them while the expression "!_" matches target strings having any one character.

The third component is the quantifier. This component specifies the quantity of the character that must occur in a word in order for there to be a match. An embodiment of the present invention uses the "?", "*", and "+" symbols as quantifiers. The "?" symbol means that the character is optional. Accordingly, the system 100 will not assess a penalty to target strings not having the character. The "*" symbol means that the character may be absent from the target string, present in the target string, or have multiple sequential occurrences in the target string. The "+" symbol means that the character must appear at least once, and may have multiple sequential occurrences.

For example, if the user enters the search expression "past", the word "past" would be identified as a perfect match. In addition, "pest" and "cast" would be identified as fuzzy matches. However, if the user enters the search expression "p!ast", the character "a" has been specified as exact. In such a case, the word "past" would still be identified as a perfect match, and cast would be identified as a fuzzy match, but "pest" would not be identified as a match.

A preferred embodiment also supports multiple character specifications within segments of search expressions. Such specifications, are well known in the UNIX world and use special characters, such as "[", "]", "~", ",", and "-", to specify multiple characters. For example, the expression "b[a,e,i,o,u]d" is an exact match for "bad", "bed", "bid", "bod", and "bud." Likewise, the search expression "a[b–e]f" is an exact match for "abf", "acf", "adf", and "aef". In addition, the "~" symbol is a "not" operator. Thus, the search expression "[a–z, ~a, ~e, ~i, ~o, ~u]" is an exact match for any character from "a" to "z" except vowels. When a user wishes to search for one of the special characters, another special character, such as "/" is placed before the special character to indicate the start of an escape sequence, thereby specifying that the special character is to be treated as a search character. A multiple character specification is treated just like a single character specification and may be combined with an exactness specifier and quantifier.

When system 100 receives a search expression in the form of a generalized regular expression, a finite-state deterministic automation parses the search expression to create the transitions for a fuzzy finite-state non-deterministic automation used to compare target strings with the search expression.

The deterministic automation parses the generalized regular expression by breaking down the generalized regular expression into its segments. Each segment determines transitions that may occur from a state tc itself, from the state to the next state, and from the next state to itself. If there are M segments in the generalized regular expression, not including an exactness specification at the end of the expression, then the automation will contain M+1 states.

The deterministic automation identifies each segment specification as fitting one of 18 syntax categories. The category depends on whether the segment is fuzzy or exact, whether the segment contains a wild card, whether the segment includes a quantifier, and the kind of quantifier, if any. When the syntax category of a segment has been identified, the deterministic automation inserts the transitions appropriate to the syntax category into the fuzzy finite-state non-deterministic automation corresponding to the identified syntax category.

Figure 6A:
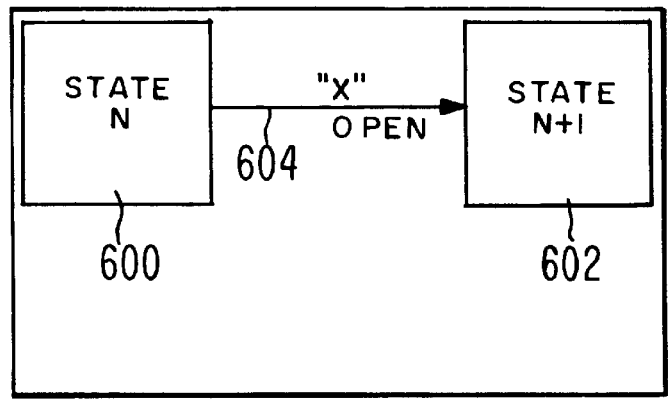
FIGS. 6A–R depict transitions corresponding to segments of a search expression.
Figure 6B:
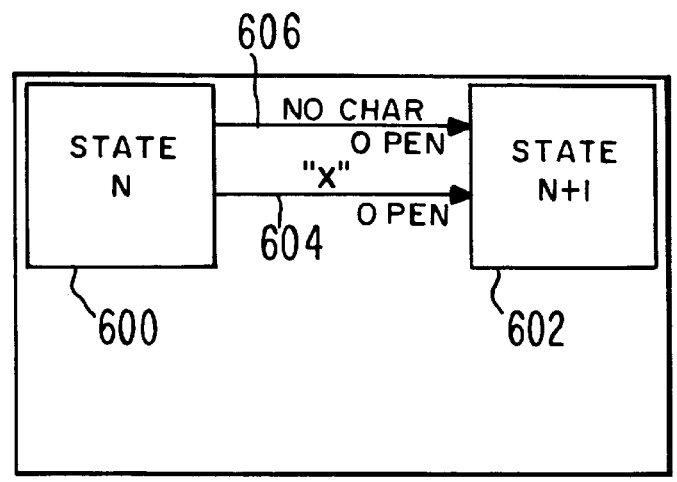
Figure 6C:
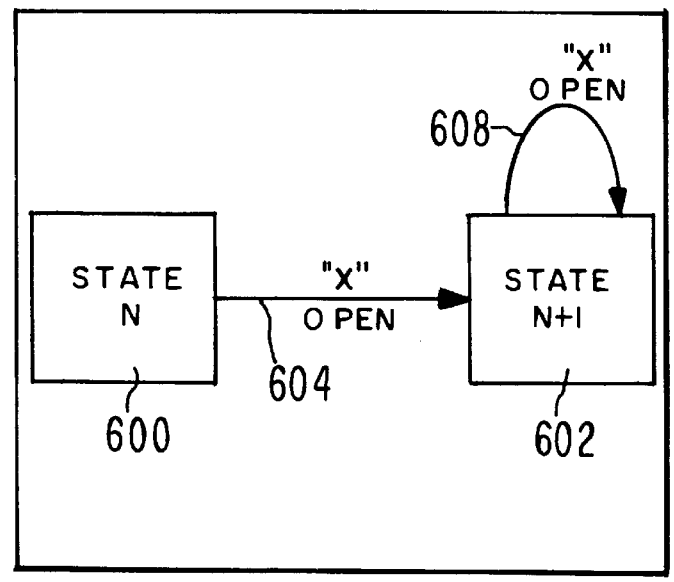
Figure 6D:
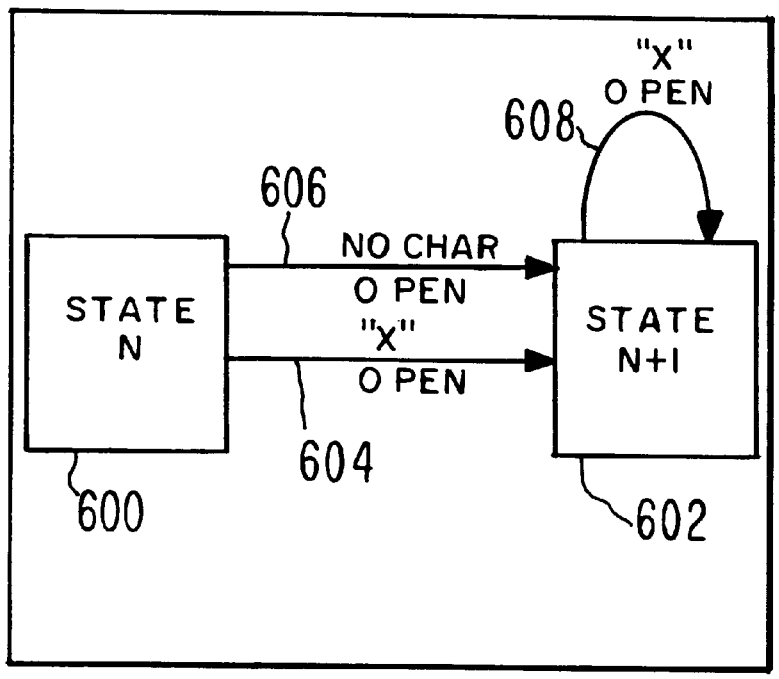
Figure 6E:
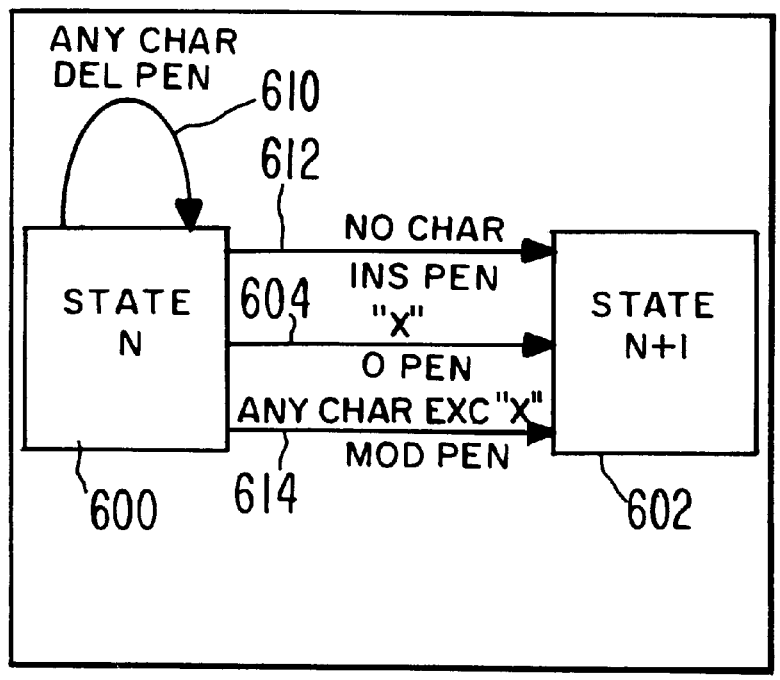
Figure 6F:
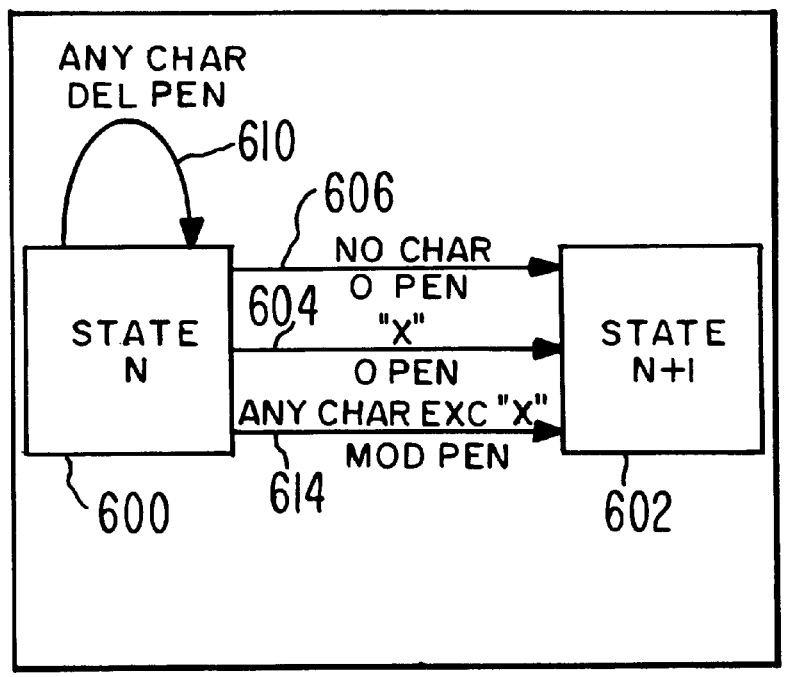
Figure 6G:
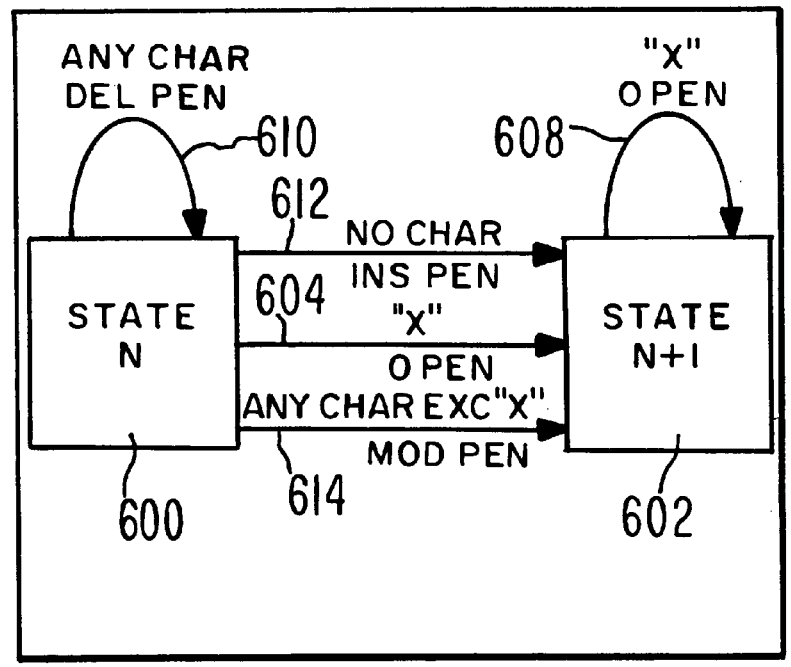
Figure 6H:
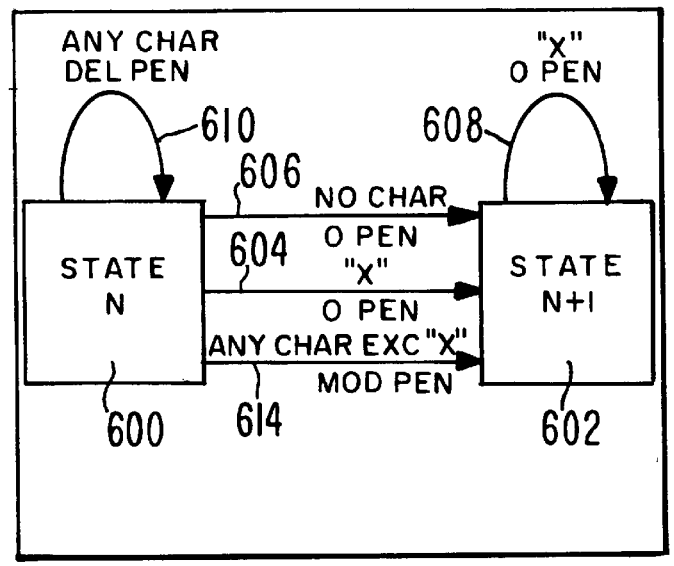
Figure 6I:
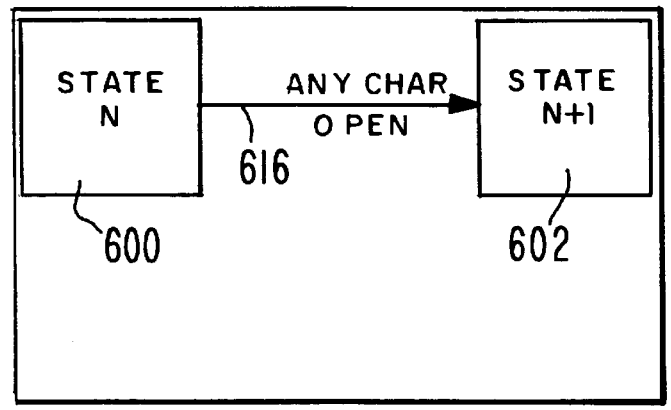
Figure 6J:
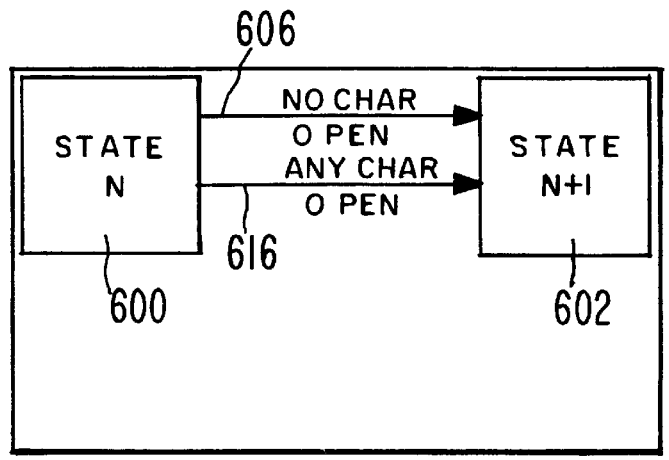
Figure 6K:
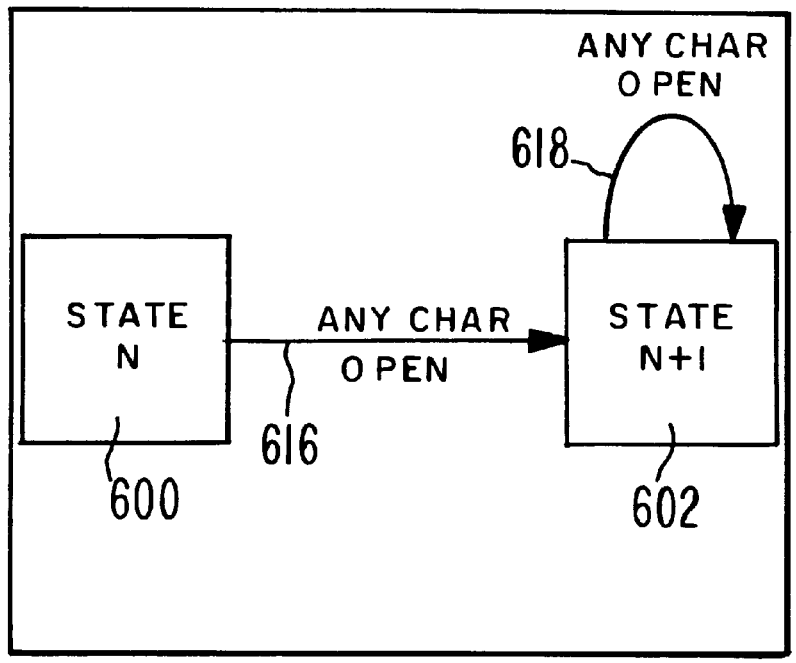
Figure 6L:
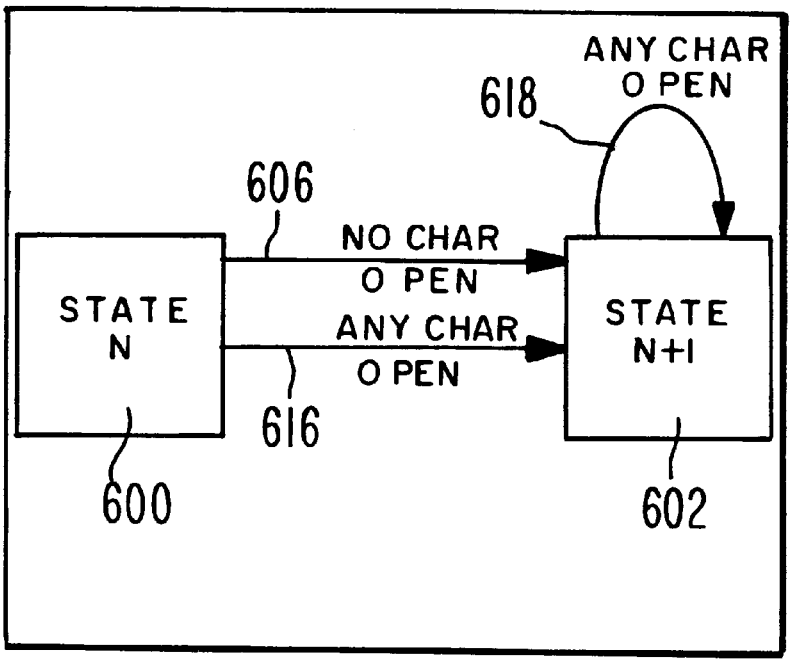
Figure 6M:
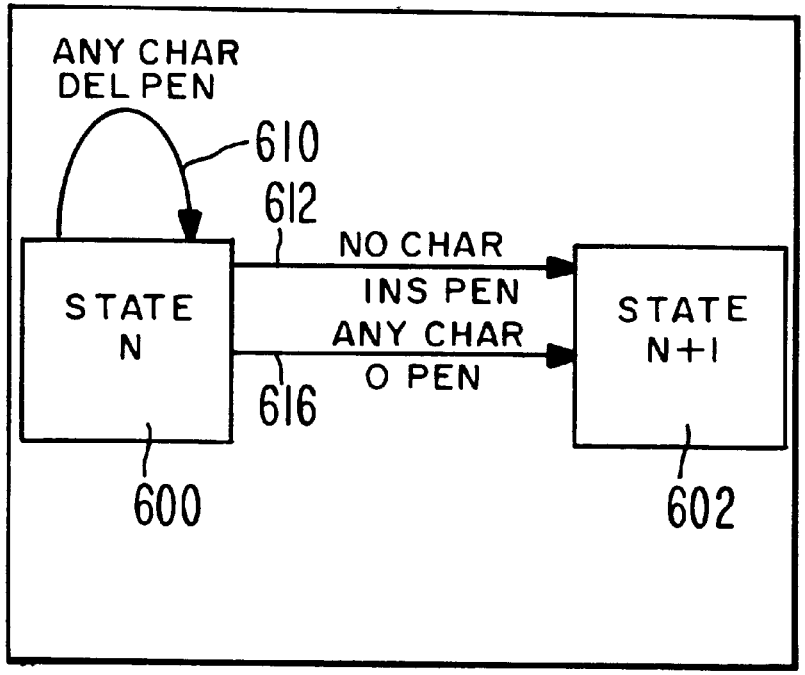
Figure 6N:
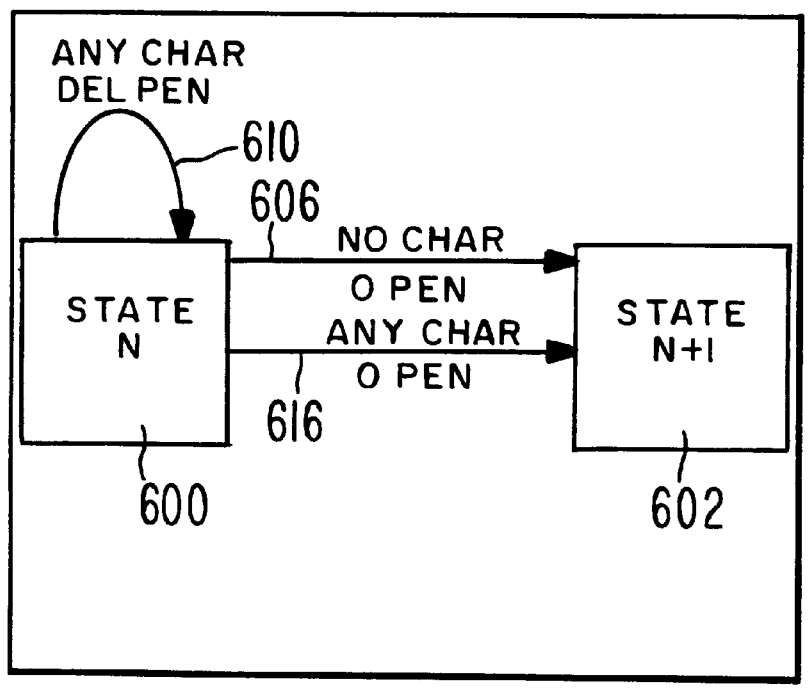
Figure 6O:
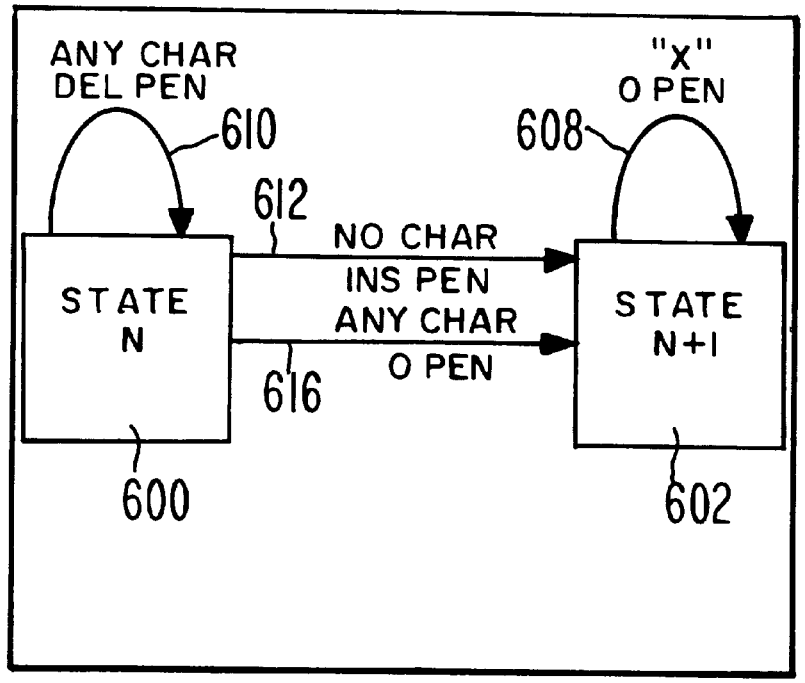
Figure 6P:
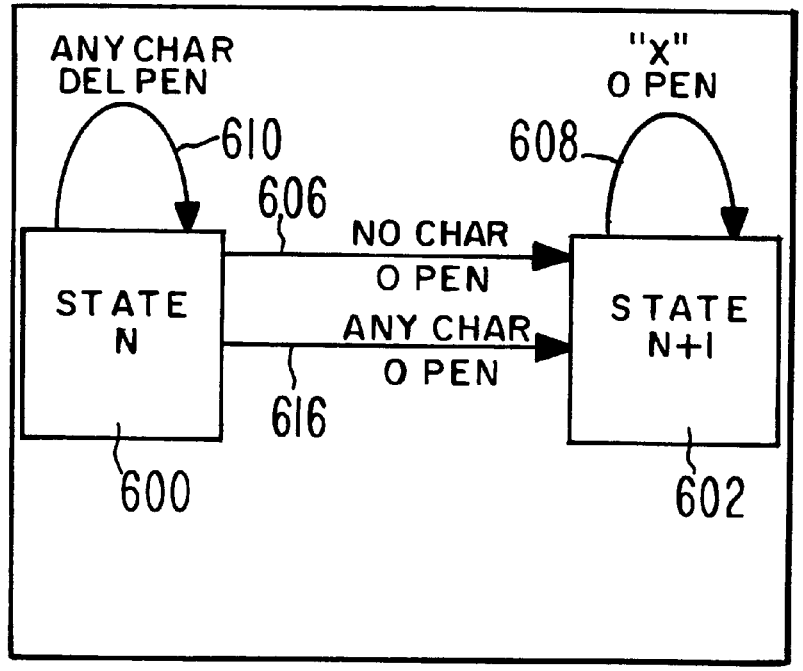
Figure 6Q:
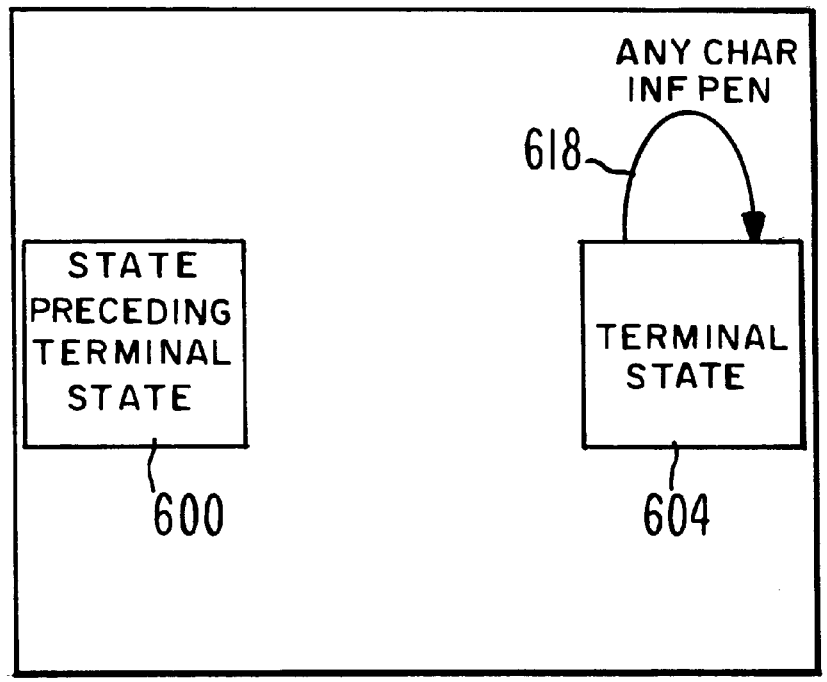
Figure 6R:
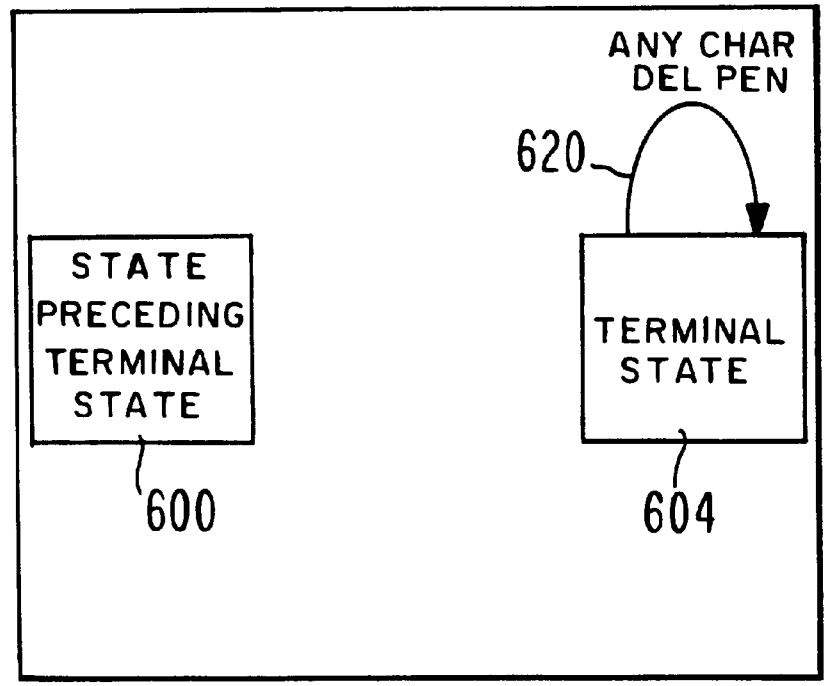

FIGS. 6A–R depict the transitions generated in the fuzzy finite-state non-deterministic automation when each of the 18 syntax categories for segments is encountered in the search expression. The following abbreviations are used in FIGS. 6A–R:

In the syntax categories in which the segment specifies a character search, the letter "x" is used to represent the search character.

"0 Pen" means that a transition can occur without penalty. This transition occurs when the character being processed provides a perfect match.

"Ins Pen" means that a transition can occur with a penalty equal to the standard character insertion penalty.

"Del Pen" means that a transition can occur with a penalty equal to the standard character deletion penalty.

"Inf Pen" means an infinite penalty, actually implemented as a very large penalty.

"No Char" means that a transition from a state to the next state can occur without processing any character. In such a situation, the penalty is either "Ins Pen" or "0 Pen."

"Any Char" means that a transition can occur as any character is processed. This situation arises when the wild card "_" specifies that any character matches the specification, in transitions from a state to itself when an incoming character is being deleted from a target string, and in the special segments represented by FIGS. 6Q–R, which occur only at the end of a search expression.

"Any Char Exc" means that a transition can occur as any character except a specified character is processed. When the specified character is processed, the standard character modification penalty is applied.

FIG. 6A depicts the transition corresponding to the segment "!x". This segment specifies an exact match of the "x" character. Accordingly, a zero penalty transition 604 from state 600 to state 602 for the character "x" is the only transition.

FIG. 6B depicts the transitions corresponding to the segment "!x?". This segment specifies an exact match of zero or one occurrence of the "x" character. Accordingly, a zero penalty transition 606 from state 600 to state 602 for no character is allowed in addition to the zero penalty transition 604 for the "x" character.

FIG. 6C depicts the transitions corresponding to the segment "!x+". This segment specifies an exact match of at least one "x" character. Accordingly, a zero penalty transition 604 for the "x" character is allowed from state 600 to state 602. In addition, a zero penalty transition 608 from state 602 to itself is allowed for additional occurrences of "x".

FIG. 6D depicts the transitions corresponding to the segment "!x*". This segment specifies an exact match of zero or more occurrences of the character "x". Accordingly, zero penalty transitions are allowed between state 600 and state 602 for "x" 604 and no character 606. In addition, a zero penalty transition 608 from state 602 to itself is allowed.

FIG. 6E depicts the transitions corresponding to the segment "x". This segment specifies a fuzzy match of the character "x". Accordingly, a zero penalty transition 604 from state 600 to state 602 is allowed for "x". A Del Pen penalty transition 610 exists from state 600 to itself, an Ins Pen penalty transition 612 exists from state 600 to state 602 for no character, and a Mod Pen penalty transition 614 exists from state 600 to state 602.

FIG. 6F depicts the transitions corresponding to the segment "x?". This segment specifies a fuzzy match of zero or one occurrence of "x". Accordingly, zero penalty transitions 604,606 from state 600 to state 602 are allowed for "x" and no character. A Del Pen penalty transition 610 exists from state 600 to itself and a Mod Pen penalty transition 614 exists from state 600 to state 602.

FIG. 6G depicts the transitions corresponding to the segment "x+". This segment specifies a fuzzy match of at least one occurrence of "x". Accordingly, zero penalty transitions 604,608 are allowed between state 600 and state 602 and state 602 and itself for "x". A Del Pen penalty transition 610 is allowed between state 600 and itself, an Ins Pen penalty transition 612 is allowed between state 600 and state 602, and a Mod Pen penalty transition 614 is allowed between state 600 and state 602.

FIG. 6H depicts the transitions corresponding to the segment "x*". This segment specifies a fuzzy match of zero or more occurrences of the character "x". Accordingly, zero penalty transitions 604,606 are allowed between state 600 and state 602 for "x" and for no character. Likewise, a zero penalty transition. 608 is allowed between state 602 and itself. A Del Pen penalty transition 610 is allowed between state 600 and itself for any character and a Mod Pen penalty transition 614 is allowed between state 614 and state 602 for any character except "x".

FIG. 6I depicts a transition corresponding to the segment "!_". This segment specifies an exact match of one occurrence of any character. Accordingly, a zero penalty transition 616 is allowed between state 600 and state 602 for any character.

FIG. 6J depicts the transitions corresponding to the segment "!_?". This segment specifies an exact match of zero or one occurrences of any character. Accordingly, zero penalty transitions 606,616 are allowed between state 600 and state 602 for no character and for any character.

FIG. 6K depicts the transitions corresponding to the segment "!_+". This segment specifies an exact match of one or more occurrences of any character. Accordingly, zero penalty transitions 616,618 are allowed between state 600 and state 602 and state 602 and itself.

FIG. 6L depicts the transitions corresponding to the segment "!_*". This segment specifies an exact match of zero or more occurrences of any character. Accordingly, zero penalty transitions 606,616,618 are allowed between state 600 and state 602 for no character or any character and between state 602 and itself for any character.

FIG. 6M depicts the transitions corresponding to the segment "_". This segment specifies a fuzzy match of any character Accordingly, a zero penalty transition 616 is allowed between state 600 and state 602 for any character. In addition, a Del Pen penalty transition 610 is allowed from state 600 to itself for any character and an Ins Pen penalty transition 612 is allowed from state 600 to state 602 for no character.

FIG. 6N depicts the transitions corresponding to the segment"?". This segment specifies a fuzzy match of zero or one occurrences of any character. Accordingly, zero penalty transitions 606,616 are allowed between state 600 and state 602 for no character or any character. In addition, a Del Pen penalty transition 610 is allowed between state 600 and itself.

FIG. 6O depicts the transitions corresponding to the segment "_+". This segment specifies a fuzzy match of one or more occurrences of any character. Accordingly, a zero penalty transition 616 is allowed between state 600 and state 602 for any character. An Ins Pen penalty transition 612 is allowed between state 600 and state 602 for no character. A Del Pen penalty transition 610 is allowed between state 600 and itself for any character. Finally, a zero penalty transition 608 is allowed between state 602 and itself for the character "x", wherein "x" is the same character that traversed transition 616. A Del Pen penalty transition 610 is allowed between state 600 and itself.

FIG. 6P depicts the transitions corresponding to the segment "_*". This segment specifies a fuzzy match of zero or more occurrences of any character. Accordingly, zero penalty transitions 606,616 are allowed between state 600 and state 602 for no character and any character Likewise, a zero penalty transition 608 is allowed between state 602 and itself for the character "x", wherein "x" is the same character that traversed transition 616. A Del Pen penalty transition 610 is allowed between state 600 and itself.

FIG. 6Q depicts a transition corresponding to having "!" as the last segment. This last segment specifies that a matching target string does not have any characters after the "!". Accordingly, an Inf Pen penalty transition 618 is allowed between a terminal state 604 and itself.

FIG. 6R depicts a transition corresponding to not having "!" as the last segment. This last segment specifies that a matching target string can be a fuzzy match if it has additional characters beyond those specified by the search expression. Accordingly, a Del Pen penalty transition 620 is allowed between a terminal state 604 and itself.

During initialization 503, each of the states in the first state set is assigned an initial value. State 0 is assigned the value 0 * Ins Pen, state 1 is assigned the value 1 * Ins Pen, state 2 is assigned the value 2 * Ins Pen, etc. In the automata of FIG. 4, for example, state 400 is assigned 0 * Ins Pen, state 410 is assigned 1 * Ins Pen, state 420 is assigned 2 * Ins Pen, and state 430 is assigned 3 * Ins Pen.

However, if the search expression contains an exactness specification, then the initialization is different. Specifically, a state following an exactness specification, that is, a state receiving an exact character, is initialized with an infinite value. In addition, all of the states following that state are also assigned an infinite value.

At step 504, the automata retrieves a character from the target string. Then, at step 505, the automata processes the character. Processing an incoming character of the target string produces new values for each state. These new values are calculated sequentially and stored in the second state set.

The value assigned to state 0 in the second slate set is Del Pen+the value of state 0 in the first state set. For states 1 through N−1 in the second state set, the value assigned to a state I is the smaller of the following three quantities:

(1) the sum of
  (a) the penalty associated with deleting the input character and remaining in the I-th state. This penalty is typically Del Pen; and
  (b) the value of the I-th state in the first state set; or
(2) the sum of
  (a) Ins Pen; and
  (b) the value of the (I–1)-st state in the first state set; or
(3) the sum of
  (a) the value of the (I–1)-st state in the first state set; and
  (b) the penalty, if any, associated with a transition from state I–1 to state I for the particular character that has just been input.

When assessing the penalty in (1)(a), above. it may be advantageous to have different penalties associated with the deletion of different characters. For example, in English the letter "e" is the most frequently occurring letter and, therefore, carries very little information. Consequently; the insertion or deletion of an "e" into the spelling of a word has little impact on a reader's ability to identify the intended word. Furthermore, the letter "e" is often silent in English, further reducing its significance in identifying a word. Accordingly, the character deletion penalty associated with the letter "e" may reasonably be specified as smaller than the standard deletion penalty or the deletion penalties associated with other letters.

When assessing the penalty in (2)(a), above, it may be advantageous to have different penalties associated with the insertion of different characters. As described above, some characters carry less information than others. Accordingly, the insertion penalty associated with such letters may be specified as smaller than the standard insertion penalty.

The penalty in (3)(b), above, represents the similarity between the incoming character and the character, or characters, specified in the (I–1)-st segment of the search expression. For example, if the incoming character s a perfect match with the character, or characters, specified in the (I–1)-st segment of the search expression, this penalty is 0. The penalty, however, may be as large as the standard character modification penalty. If OCR or phonetic fuzziness is in use, and the incoming character is fuzzly similar or OCR similar to a character specified in the (I-1)-st segment of the search expression, then the penalty would typically have a value between 0 and the standard character modification penalty.

After the automata has completed processing each character, the values stored in the second state set are copied back to the first state set. After each character has been input and processed, the value of the last state (i.e., state N–1) contains the measure of dissimilarity between the search expression and the target string.

Thus, by constructing automata of search expressions for text strings that are desired to be found in a document, each text string stored in document storage medium 108 may be processed. Upon completion of processing for each such document text string, the value associated with a terminal state is considered. Whether a text string is a "hit" depends upon whether the search performed is a threshold search, a best of N search, or a combination of both, as well as whether the priority queue, in the case of a best of N search, is already full.

In accordance with the present invention, the values associated with each state of a fuzzy non-deterministic state machine need not be restricted to non-negative numbers; the elements of an ordered Abelian semigroup or finite crossproduct of ordered Abelian semigroups may be used to measure dissimilarity between a search term and a target symbol sequence. Thus, there is no need for a numeric metric, and other metrics that can be used to construct a hierarchy of dissimilarity may be used as well. As an example, vectors consisting of finite sequences of elements of the Abelian semigroup may be used to determine relative dissimilarity between an incoming character string and a desired pattern.

In such case, a user could perform a sensitivity analysis on the penalties related with particular transition rules to better suit the results obtained with those desired by the user. Specifically, the value associated with each state of the automation may consist of a vector of non-negative numbers, each computed using different sets of penalties for the rules. The dissimilarity values $D_i$ associated with different sets of penalties may then be examined to evaluate the appropriateness of various sets of penalty values. If two penalty sets differ in penalty values assigned to only one of the rules, the difference in similarity values provides an indication of the sensitivity of the similarity values to the particular rule. Such a sensitivity analysis may be used to adaptively modify penalties in order to calculate penalties in such a way that dissimilarity values correspond to a user's rating of similarity between a search term and a target.

From the above, it should also be recognized that search expressions more complex than a single word or providing for "wildcards", optional symbols, repeated symbols, or sets of allowed symbols or strings of symbols will result in automata that are complex. Such automata may include branches that may or may not reunite, may contain loops, and may contain other kinds of transitions. It should also be recognized that provision for "fuzzy" characteristics, such as modified, extra or missing characters; exchanged adjacent characters; phonetic replacements; optical character recognition errors (e.g., "m" for "rn"); capitalization; grammatical errors; and affixes may all be handled by including appropriate transitions in an automation. Similarly, ambiguity as to spaces between characters or words, hyphens, and characters marked as indecipherable or ambiguous by optical character recognition apparatus may be appropriately handled by corresponding transition rules. It should also be apparent that not only body text from documents, but text abstracting or describing documents, document titles, and other text is searchable in the manner described herein.

In one embodiment, when used with an OCR system that can provide confidence levels for recognition of particular symbols, each symbol may have associated with it a confidence factor and possible alternate symbols, and penalty values can be adapted from this information.

Some further examples illustrating the flexibility of operation provided by various embodiments are discussed below.

Figure 7:
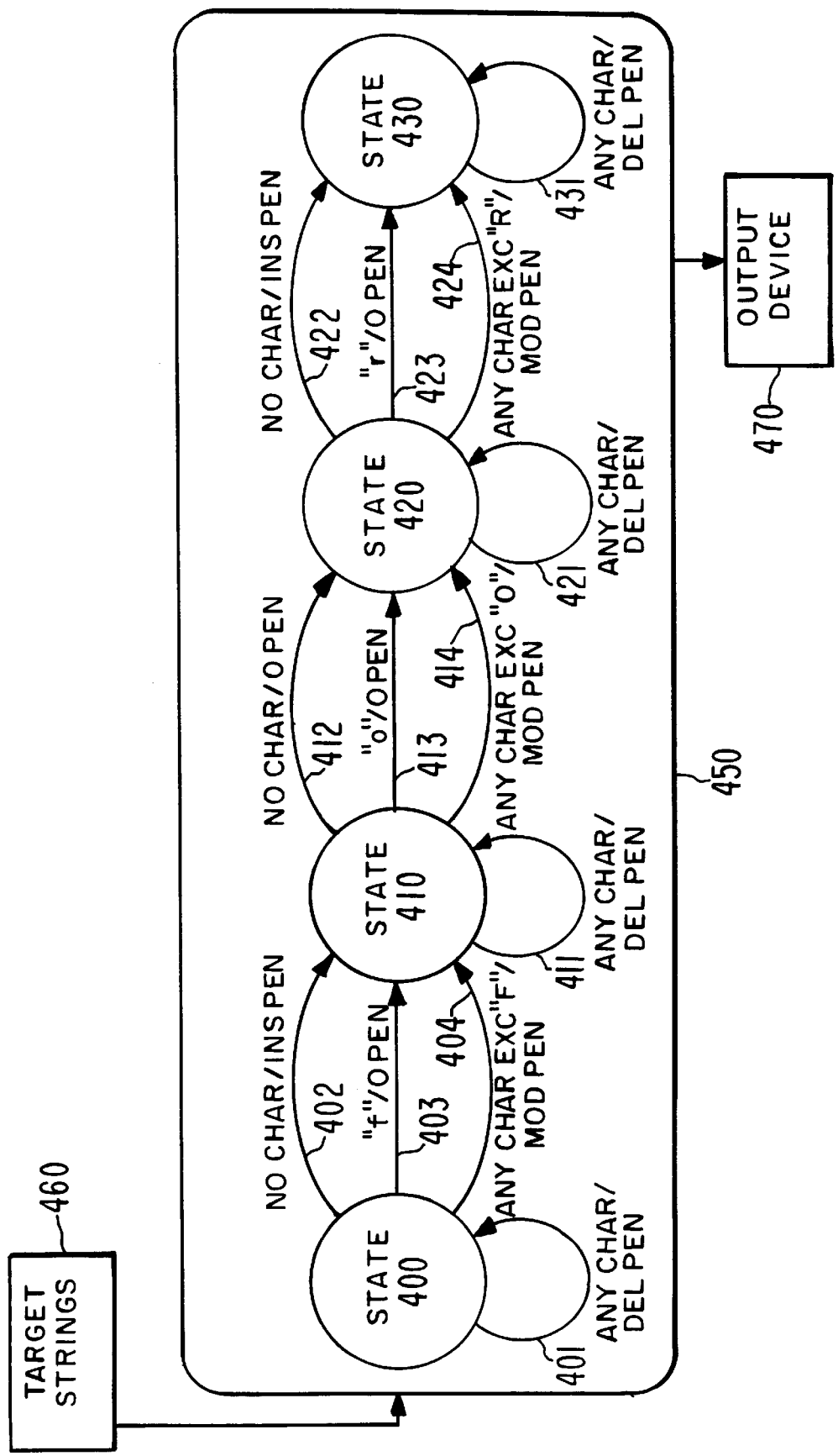
FIG. 7 shows a state diagram of a finite-state non-deterministic automation featuring processing of optional characters in accordance with the present invention.

Optional characters. Fuzzy non-deterministic finite-state automata are able to perform searches for patterns in which portions of the pattern are optional. FIG. 7 illustrates a fuzzy non-deterministic finite-state automation for detecting the word "for", but the letter "o" is treated as optional, so that both "for" and "fr" are determined by the automation to be perfect matches. FIG. 7 is identical to FIG. 4, except that transition rule 412 has zero penalty, permitting transition from state 410 to state 420 without penalty.

One-to-many, many-to-one, and many-to-many character substitutions. The basic operation of a linear fuzzy finite-state non-deterministic automation can be extended to support one-to-many, many-to-one, and many-to-many character substitutions. One-to-many character substitutions include one-to-zero substitution, such as deleting a specific character, one-to-two substitution, such as replacing the letter "f" by "ph", and one-to-three substitution, such as replacing "t" with "ght".

In order to support such one-to-many character substitutions, a list 112 of available one-to-many character substitutions must be available to the system 100. Such a list 112 is typically created in advance and stored within a memory 106 of the system 100.

Figure 8:
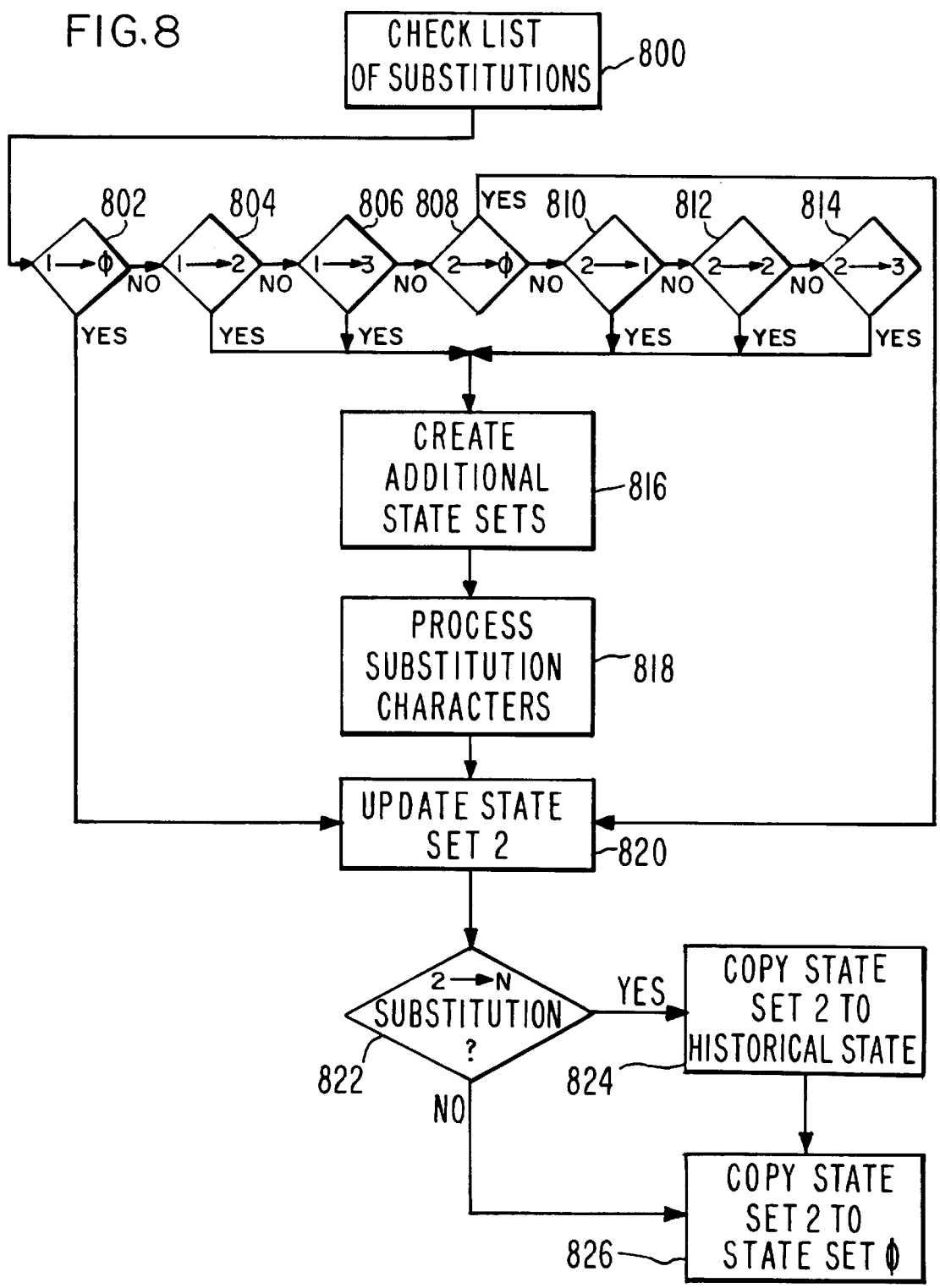
FIG. 8 depicts a flow chart of processing using one-to-zero, one-to-many, two-to-zero, two-to-one, and two-to-many character substitution.

FIG. 8 depicts a flow chart of the steps performed by system 100 when performing one-to-zero, one-to-many, two-to-zero, two-to-one, and two-to-many character substitution. After the basic fuzzy finite-state non-deterministic automation processes an incoming character from state set 0 to state set 2, the list 112 of one-to-many substitutions for the incoming character is examined to determine whether there are any one-to-many substitutions for the incoming character (step 800). If there are any such substitutions, each of the available substitutions is dealt with as follows:

1In the case 802 of a one-to-zero substitution, each value stored in state set 2 is replaced at step 820 by the minimum of (a) its current value; and (b) the sum of:

the character substitution penalty; and the value of the corresponding state in state set 0.

Note that a one-to-zero substitution is equivalent to a character deletion. Depending on the letter being deleted, it may be more appropriate to use the standard character deletion penalty or a special character deletion penalty. Likewise, it may be appropriate to use a penalty smaller than the standard deletion penalty if the character carries little weight.

2. In the case 804 of a one-to-two substitution, processing requires two additional state sets, here named state set A and state set B (step 816). Then, at step 818, the first substitution character is processed from state set 0 to state set A and the second substitution character is processed from state set A -to state set B.

However, in order to prevent an exchanged character from providing a fuzzy match in the situation in which an exact match has been specified, when processing a substituted incoming character and the incoming character would normally bring about a transition from any state I–1 to a successor state I with a penalty of zero, the system 100 substitutes an "infinite" (i.e., very large) penalty. In other words, when processing the segments represented by FIGS. 6A–C, the system 100 removes transition 604, thereby effectively replacing the 0 penalty transition with an infinite penalty.

Next, each value stored in state set 2 is replaced at step 820 by the minimum of (a) its current value; and (b) the sum of:

the character string substitution penalty; and the value of the corresponding state in state set B.

In some circumstances, it may be more appropriate to use a standard string substitution penalty or a specific one-to-two string substitution penalty. A one-to-two substitution is equivalent to a character modification and a character insertion. Accordingly, a penalty less than the sum of the standard character modification and the standard character insertion penalty may be appropriate.

3. In the case 806 of a one-to-three substitution, processing requires three additional state sets, here named state set A, state set B, and state set C (step 816). At step 818, the first substitution character is processed from state set 0 to state set A, the second substitution character is processed from state set A to state set B, and the third substitution character is processed from state set B to state set C.

In order to prevent a substituted character from providing a fuzzy match in the situation in which an exact match has been specified, when processing a substituted incoming character and the incoming character would normally bring about a transition from any state I–1 to a successor state I with a penalty of zero, the system 100 substitutes an "infinite" (i.e., very large) penalty. In other words, when processing the segments represented by FIGS. 6A–C, the system 100 removes transition 604, thereby effectively replacing the 0 penalty transition with an infinite penalty.

Next, each value stored in state set 2 is replaced at step 820 by the minimum of (a) its current value; and (b) the sum of:

the character substitution penalty; and the value of the corresponding state in state set B.

Finally, in each of the above substitutions, state set 2 is copied into state set 0 (step 826).

In order to support two-to-many character substitutions, the system 100 must maintain historical information about the contents of state set 0. Specifically, in order to support two-to-many character substitutions, the system 100 must know the contents of state set 0 before the previous character was processed. In the basic operation of the fuzzy finite-state non-deterministic automation, regardless of whether one-to-many character substitutions are supported, the last step 826 in processing a character from one state set to another involves copying state set 2 into state set 0. In order to support two-to-many character substitutions (case 822), before copying state set 2 into state set 0, system 100 must first save a copy of state set 2 by copying it into another state set (step 824), here named state set H1, or Historical state set 1.

In order to support such two-to-many character substitutions, a list 112 of available two-to-many character substitutions must be available to the system 100. Such a list 112 is typically created in advance and stored within a memory 106 of the system 100. After the basic fuzzy finite-state non-deterministic automation processes an incoming character from state set 0 to state set 2, the list 112 of two-to-many substitutions for the incoming character is examined (step 800) to determine whether there are any two-to-many substitutions for the incoming character. If there are any such substitutions, each of the available substitutions is dealt with as follows:

1. In the case 808 of a two-to-zero substitution, each value stored in state set 2 is replaced at step 820 by the smaller of (a) its current value; and (b) the sum of:

the character substitution penalty; and the value of the corresponding state in state set 0.

Note that a two-to-zero substitution is equivalent to two character deletions. In some circumstances, it may be more appropriate to use a standard string substitution penalty. Alternatively, a special penalty less than twice the standard character deletion penalty can be used.

2. In the case 810 of a two-to-one substitution, the substitution character is processed at step 818 from state H1 to an additional state set, here named state set A.

In order to prevent a substituted character from providing a fuzzy match in the situation in which an exact match has been specified, when processing a substituted incoming character and the incoming character would normally bring about a transition from any state I–1 to a successor state I with a penalty of zero, the system 100 substitutes an "infinite" (i.e., very large) penalty. In other words, when processing the segments represented by FIGS. 6A–C, the system 100 removes transition 604, thereby effectively replacing the 0 penalty transition with an infinite penalty.

Then, each value stored in state set 2 is replaced at step 820 by the smaller of (a) its current value and (b) the sum of:

the character string substitution penalty; and the value of the corresponding state in state set 0.

In some circumstances, it may be more appropriate to use a standard string substitution penalty or a specific two-to-one string substitution penalty. Since a two-to-one substitution is equivalent to a character deletion and a character modification, a penalty less than the sum of the standard character deletion penalty and the standard character modification penalty is recommended.

3. In the case 812 of a two-to-two substitution, processing requires two additional state sets, here named state set A and stale set B. The first substitution character is processed at step 818 from state set H1 to state set A. Next, the second substitution character is processed from state set A to state set B.

Then, each value stored in state set 2 is replaced at step 820 by the smaller of (a) its current value and (b) the sum of:

the character substitution penalty; and the value of the corresponding state in state set B.

In some circumstances, it may be appropriate to use a standard string substitution penalty, a specific two-to-two string substitution penalty, or other penalty less than twice the standard character modification penalty 4. In the case 814 of a two-to-three substitution, processing requires three additional state sets, here named state set A, state set B, and state set C. The first substitution character is processed at step 818 from state set 0 to state set A. Next, the second substitution character is processed from state set A to state set B. Then, the third substitution character is processed from state set B to state set C.

In order to prevent a substituted character from providing a fuzzy match in the situation in which an exact match has been specified, when processing a substituted incoming character and the incoming character would normally bring about a transition from any state I−1 to a successor state I with a penalty of zero, the system 100 substitutes an "infinite" (i.e., very large) penalty. In other words, when processing the segments represented by FIGS. 6A–C, the system 100 removes transition 604, thereby effectively replacing the 0 penalty transition with an infinite penalty.

Then, each value stored in state set 2 is replaced at step 820 by the smaller of (a) its current value and (b) the sum of:

the character substitution penalty; and the value of the corresponding state in state set C.

Finally, in each type of two-to-many substitution, state set 2 is copied into state set 0 (step 826). Of course, the procedures outlined above in 2, 3, and 4 are readily generalized to higher order substitutions.

If there are several kinds of character substitutions to be made, the system 100 first processes the incoming character from state 0 to state 2. Then, the system 100 processes each of the available substitutions of each kind of substitution, creating back-up state sets as needed. Finally, the system 100 copies state set 2 to state set 0.

In addition, the techniques for one-to-many and two-to-many character substitutions are readily generalized to N-to-many character substitutions, where N>2. To support three-to-many character substitutions, for example, there must be two backup states. State set H2 would contain the contents of state set 0 prior to the processing of the previous two incoming characters and state set H1 would contain the contents of state set 0 prior to the processing of the previous incoming character.

Figure 9:
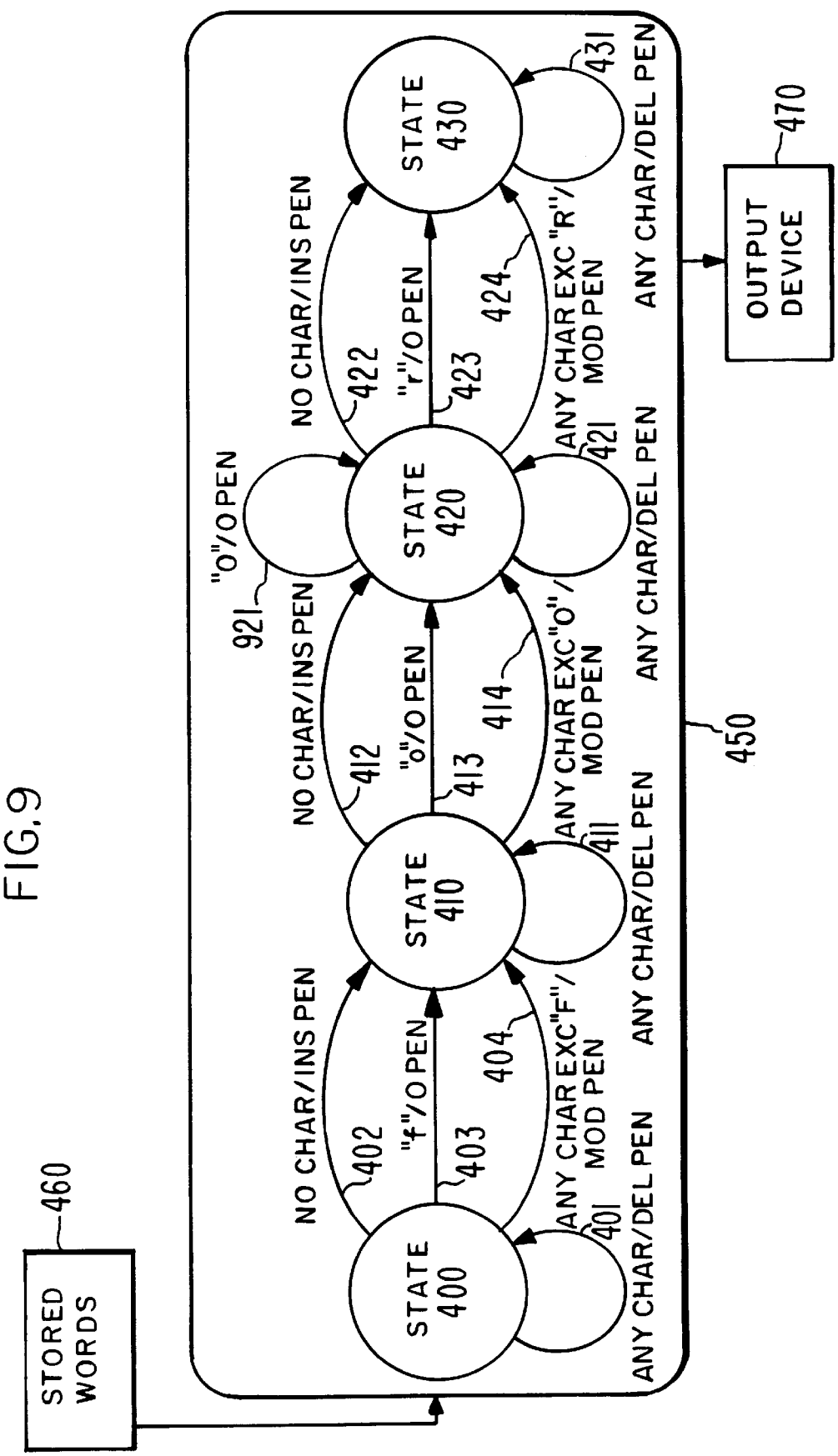
FIG. 9 shows a state diagram of a finite-state non-deterministic automation featuring processing of repeatable characters in accordance with the present invention.

Repeated characters. Fuzzy non-deterministic finite-state automata are able to perform searches for patterns in which portions of the pattern are permitted to be repeated. FIG. 9 illustrates a fuzzy non-deterministic finite-state automation for detecting the word "for", but the letter "o" is treated as repeatable, so that "for", "foor", "fooor", "foooor", etc. are determined by the automation to be perfect matches. FIG. 9 is identical to FIG. 4 except that it contains one additional transition rule 921 permitting the automation to remain in state 420 without penalty when the letter "o" is processed in the incoming stream.

Figure 10:
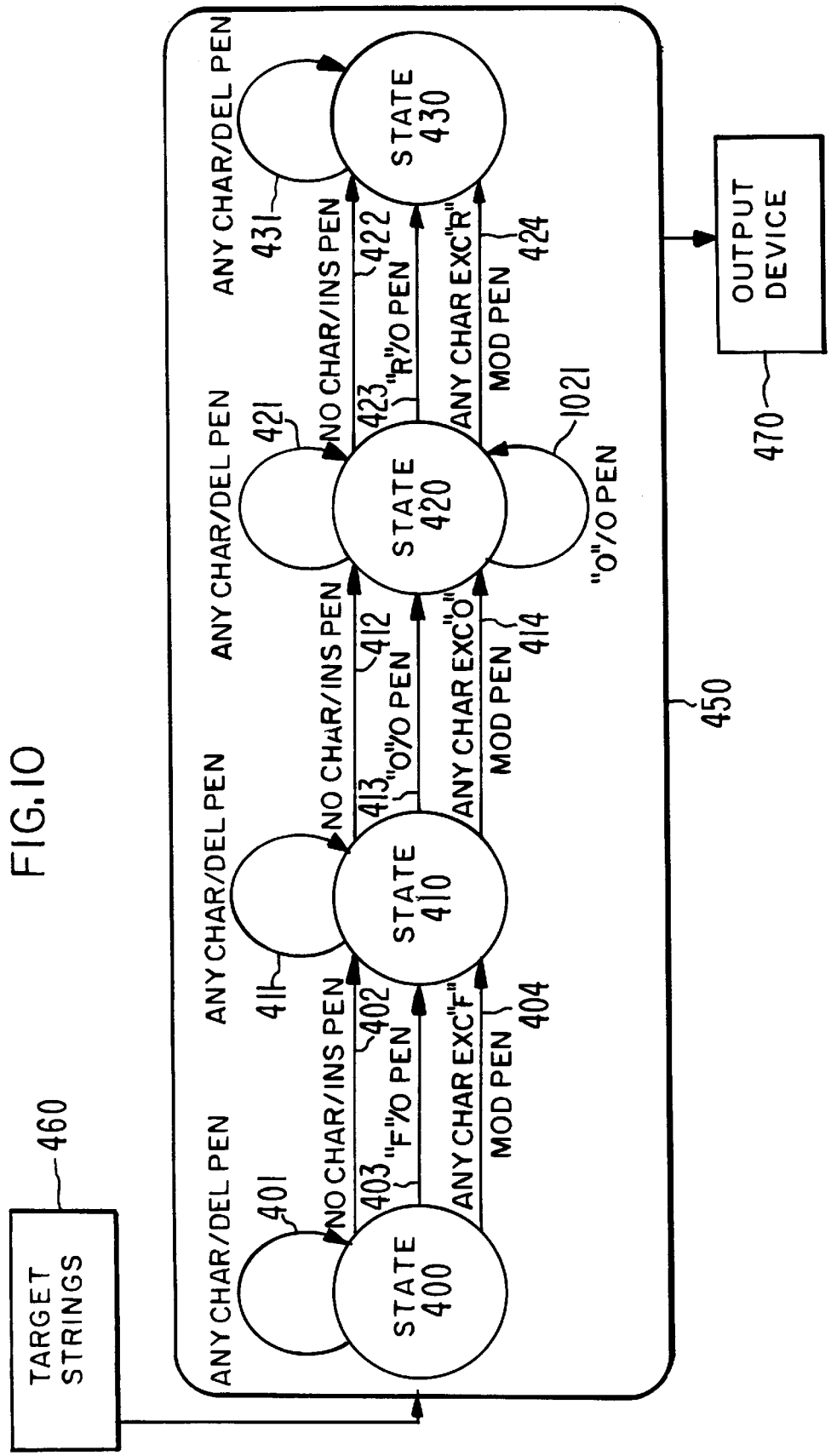
FIG. 10 shows a state diagram of a finite-state non-deterministic automation featuring processing of repeatable and optional characters in accordance with the present invention.

Optional repeated characters. Fuzzy non-deterministic finite-state automata are able to perform searches for patterns in which portions of the pattern are permitted to be either optional or repeated. FIG. 10 illustrates a fuzzy non-deterministic finite-state automation for detecting the word "for", but the letter "o" is treated as both optional and repeatable so that "fr", "for", "foor", "fooor", "foooor" are all determined by the automation to be perfect matches. FIG. 10 is identi(al to FIG. 4 except that rule 412 permitting a transition from state 410 to 420 has zero penalty, and there is an additional rule 1021 permitting the automation to remain in state 420 when a letter "o" is processed. Rule 412 permits the letter "o" to be omitted, and rile 1021 permits the "o" to be repeated.

Figure 11:
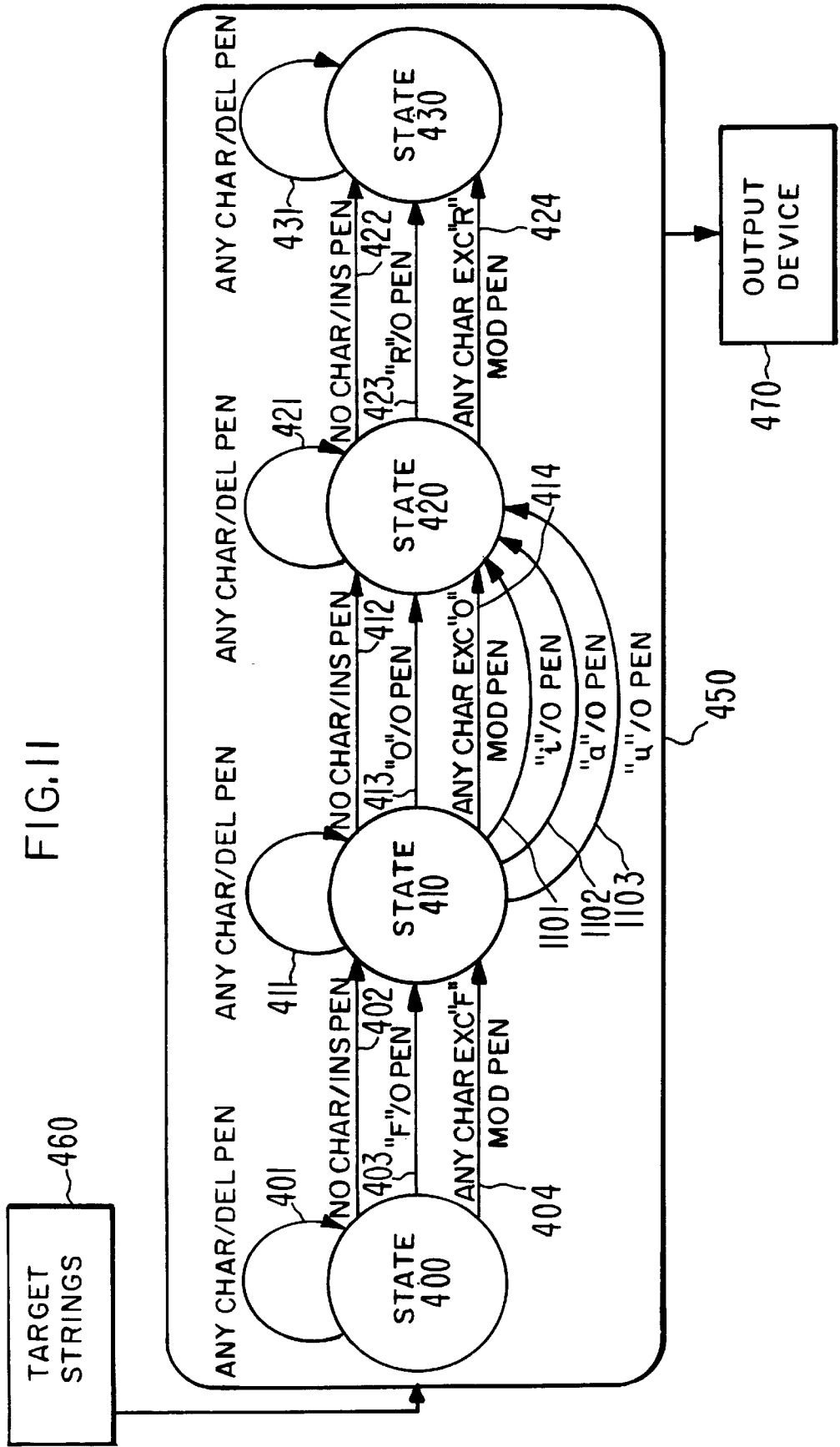
FIG. 11 shows a state diagram of a finite-state non-deterministic automation featuring processing of multiple allowable characters in accordance with the present invention.

Sets of characters. Fuzzy non-deterministic finite-state automata are able to perform searches for patterns in which portions of the pattern are permitted to be selected from sets of characters. FIG. 11 illustrates a fuzzy non-deterministic finite-state automation for detecting the words "far", "fir", "for", and "fur" as perfect matches. FIG. 11 is identical to FIG. 4 except that rules 1101, 1102, and 1103 have been added to permit a zero-penalty transition from state 410 to state 420 when characters "a", "i", "o", or "u" are received.

One-To-One Fuzzy Character Substitutions. Suppose that the fuzzy finite-state non-deterministic automation has a transition with no penalty from state I−1 to state I when the letter "c" is input. The letter "c" is sometimes confused with the letter "o" in the OCR process, so it might be appropriate to treat "o" as a near match to "c". In addition, the letter "c" is sometimes phonetically pronounced like the letter "k", so it might be appropriate to regard the "k" as a near match to "c", Also, the letter "c" is located on the standard typewriter keyboard next to the letters "x" and "v", so a typist might accidentally type "x" or "v" instead of "c". In all these cases, the automation must be able to process an incoming character that is not "c" almost as though it were "c".

A preferred embodiment of the present invention allows a user to specify whether the automation should perform OCR fuzziness, phonetic fuzziness, keyboard fuzziness, or other kinds of fuzziness. If so, then the present invention implements one-to-one character substitution for the kind or kinds of fuzziness specified. For example, if the user specifies OCR fuzziness and the search expression is "for", a target word "fcr" would be discovered as a near match having a small penalty.

A preferred embodiment of the present invention maintains lists 114 of fuzzy one-to-one character substitutions and associated penalties in a memory such as memory 106. If the user specifies a non-exact transition, chooses; to use one or more specific kinds of fuzziness, and includes a character that is fuzzily-similar to some other character in the search expression, then when the fuzzy finite-state non-deterministic automation is constructed and the system 100 inserts a zero-penalty transition from one state to the next for the specified character, the system 100 also inserts "fuzzy," or low-penalty transitions between the same two states for characters which are similar to the specified character. Such penalties fall in a range between 0 and the standard character modification penalty.

Figure 12:
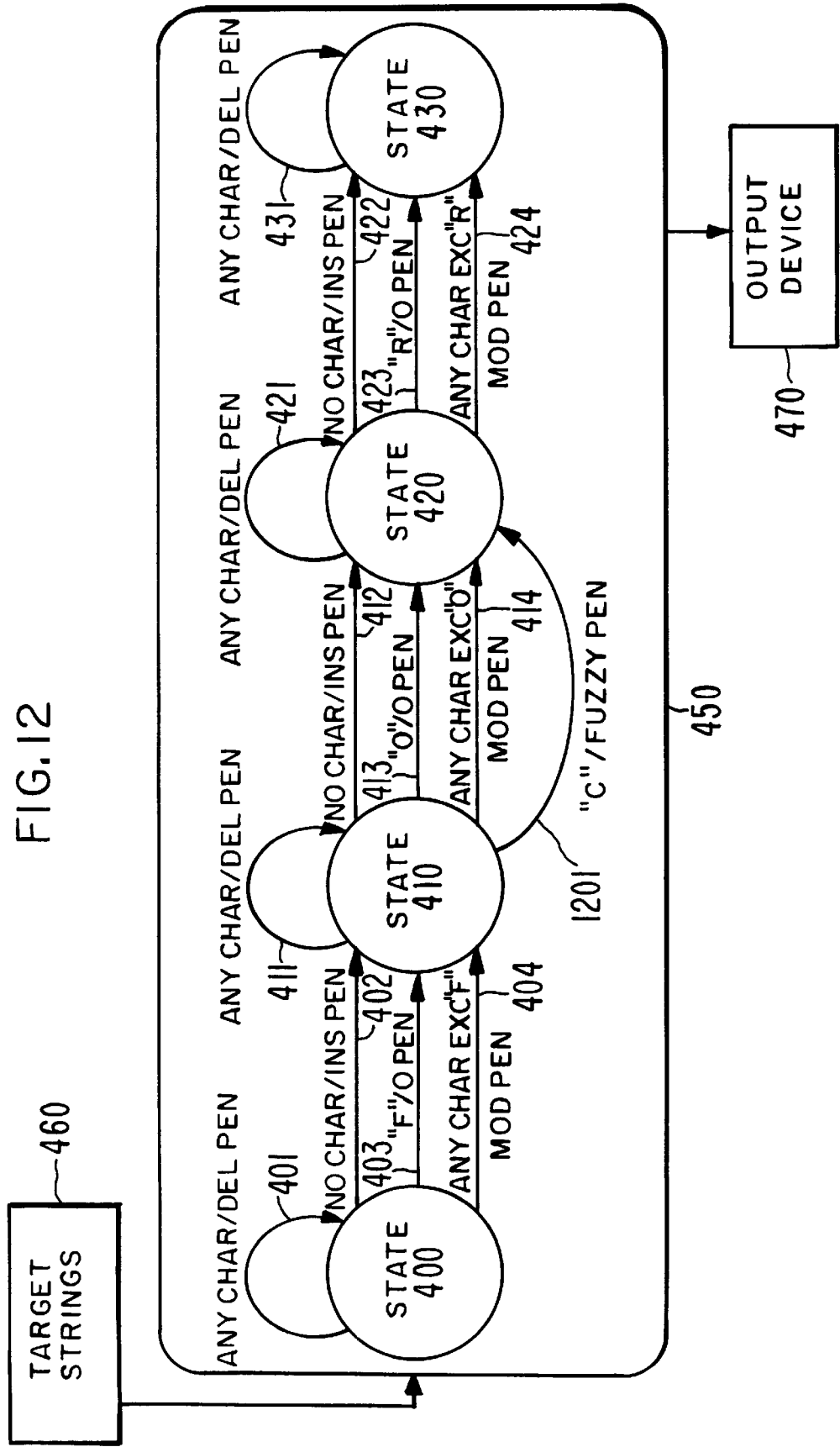
FIG. 12 shows a state diagram of a finite state non-deterministic automation featuring processing of fuzzy character substitutions in accordance with the present invention.

FIG. 12 shows a state diagram of a finite-state non-deterministic automation featuring processing of fuzzy character substitutions in accordance with the present invention. FIG. 12 is identical to FIG. 4 except that rule 1201 has been added to permit a "fuzzy penalty" transition between states 410 and 420 when the character "c" is received.

Figure 13:
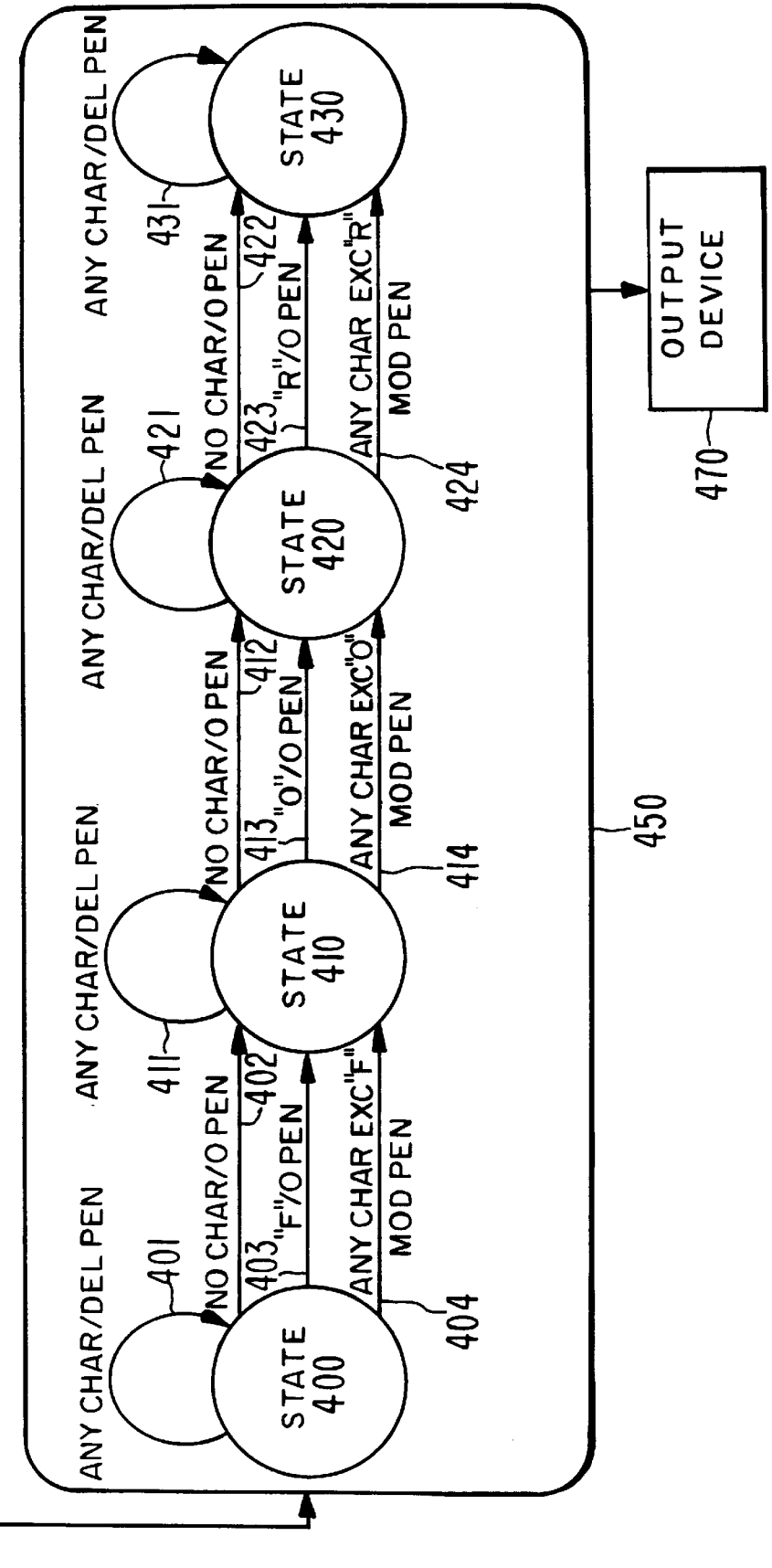
FIG. 13 shows a state diagram of a finite-state non-deterministic automation featuring processing of multiple allowable character segments in accordance with the present invention.

Matching segments of a search term. Suppose that a search is desired for information about a phenomenon which has been termed "psychosocial", and it is desired for each of the strings "psychosocial", "psycho", and "social" to be identified as perfect matches. Fuzzy non-deterministic finite-state automata are capable of performing such searches. For simplicity, instead of looking for "psychosocial", assume that a search is desired for the word "for", but that "fo", "fr", "or", "f", "o", or "r" are considered perfect matches. In the automation illustrated in FIG. 13, state 400 is an initial state, but rules 402 and 412 enable states 410 and 420 to also act as though they were initial. Similarly, rules 412 and 422 enable states 410 and 420 to act as though they were terminal states, although state 430 is the only true terminal state.

Exchanged adjacent characters. Exchanging adjacent characters is a frequently encountered typing or spelling error, so it may be desired to assign a lower penalty level to such an error. For example, if the search expression is "for", the target strings "ofr" and "fro" may be likely matches. Accordingly, the user may wish to assign lower dissimilarity values to such words.

If the search expression "abcdef" is specified, a user might like to find any of the following target strings as close matches:

"abcdfe"—characters 5 and 6 exchanged;
"abdcef"—characters 3 and 4 exchanged;
"abcedf"—characters 4 and 5 exchanged;
"abdcfe"—characters 3 and 4 and characters 5 and 6 exchanged;
"bacdef"—characters 1 and 2 exchanged;
"bacdfe"—characters 1 and 2 and characters 5 and 6 exchanged;
"badcef"—characters 1 and 2 and characters 3 and 4 exchanged;
"bacedf"—characters 1 and 2 and characters 4 and 5 exchanged;
"badcfe"—characters 1 and 2, characters 3 and 4, and characters 5 and 6 exchanged;
"acbdef"—characters 2 and 3 exchanged;
"acbedf"—characters 2 and 3 and characters 4 and 5 exchanged; and
"acbdfe"—characters 2 and 3 and characters 5 and 6 exchanged.

As discussed with respect to FIG. 8, one embodiment of the system 100 uses first and second states sets in order to process characters of the target string. Briefly, the data contained in the first state set and an incoming character is transformed into a second state set. After the second state is calculated, the second state is copied back to the first state set.

When performing fuzzy matching and checking for exchanged adjacent characters, the system 100 uses five state sets, arbitrarily named states 0–4. In the following example, assume that the system 100 is processing the search expression "abcdef" to determine its dissimilarity metric with a target string. In addition, assume that there is a "character swap penalty" in addition to the insertion, deletion, and modification penalties.

Figure 14:
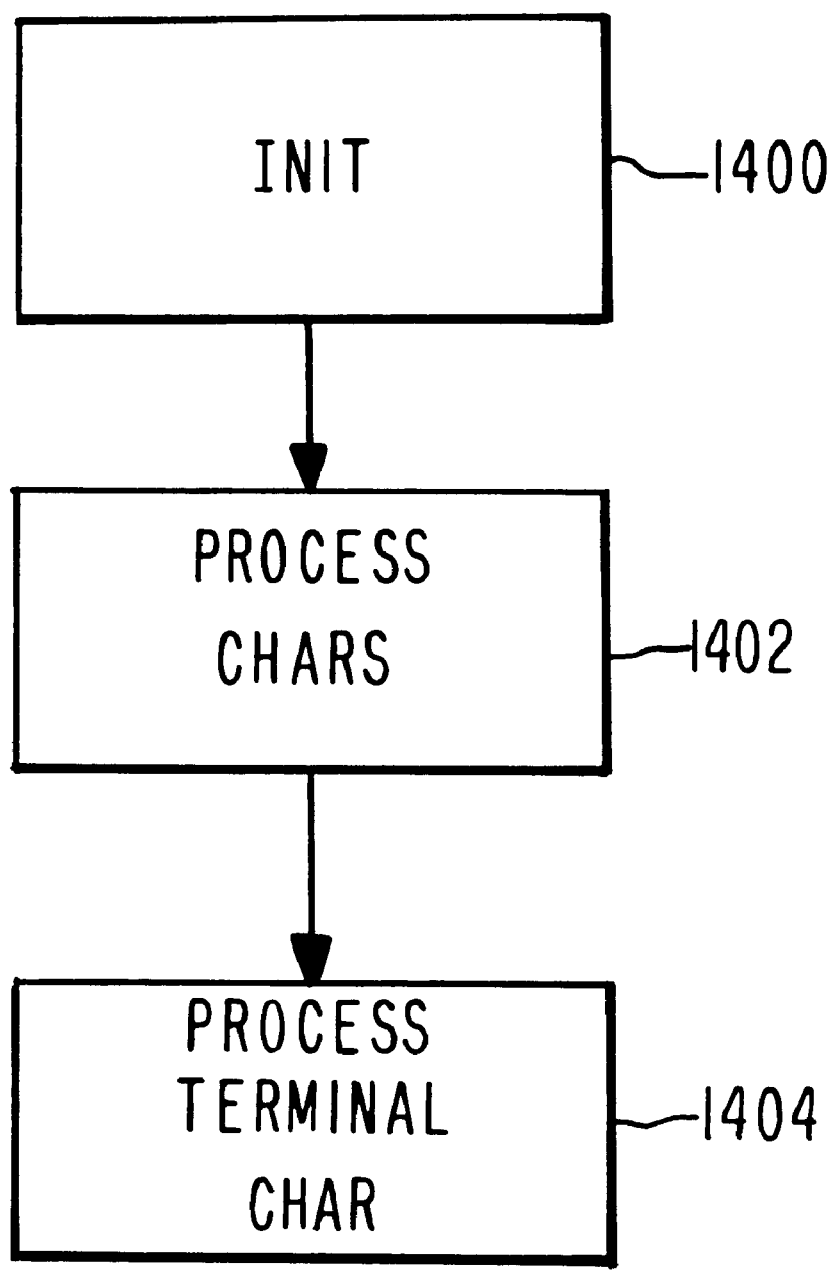
FIG. 14 shows a flow chart of processing one-to-one fuzzy character substitution in accordance with the present invention.

FIG. 14 depicts the operation of an automation performing exchanged adjacent character matching. At the initialization step 1400, the system 100 initializes state set 0 as discussed above with respect to step 503. Then, character "a" is processed from state set 0 to state set 2. In other words, state set 0 holds the value of the automation before "a" is processed while state set 2 holds the value of the automation after "a" is processed. Next, character "b" is processed from state set 0 to state set 4. State set 2 is copied to state set 0 and state set 4 is copied to state set 1.

Next, at step 1402, the system 100 iteratively processes each character in the target string. Character "b" is processed from state set 0 to state set 2 and character "a" is processed from state set 1 to state set 3. Then, the value of each state in state set 2 is replaced with the minimum of:

its previous value; and
the character swap penalty plus the value of the corresponding state in state set 3.

If all of the values in state set 2 are greater than a specified threshold, or if all of the values in state set 2 are greater than the Nth best match previously found where a number N of best matches has been specified and there are already N matches in the priority queue, then the matching process is aborted because there is no longer a possibility that the target string will have a match less than the specified threshold, or that it will be among the N best matches. If the matching process is not aborted, then character "c" is processed from state set 0 to state set 4, state set 2 is copied to state set 0, and state set 4 is copied to state set 1.

The above step 1402 is repeated for each character that is not a terminal character by incrementing each character to the next character in the string. In other words, where Y is the number of characters in the search string, step 1402 is iterated Y-2 times. In the next iteration of step 1402, for example, character "c" is processed from state set 0 to state set 2, character "b" is processed from state set 1 to state set 3, and character "d" is processed from state set 0 to state set 4. The copying steps remain the same throughout the iterations.

Once the final character is reached, the automation performs the final step 1404. In the final step, the first three processes are the same as in step 1402. Thus, in our example, the final step processes character "f" from state set 0 to state set 2 and character "e" from state set 1 to state set 3. Then, the value of each state in state set 2 is replaced with the minimum of:

its previous value; and
the character swap penalty plus the value of the corresponding state in state set 3.

If all the values in state set 2 are greater than the N-th best match previously found, the matching is aborted. Otherwise, the dissimilarity metric between the search expression and the target string is found in the last state of state set 2.

In carrying out the steps described above, incoming characters are processed in the normal manner when being processed from state set 0 to state set 2. However, in order to prevent an exchanged character from providing a fuzzy match in the situation in which an exact match has been specified in the search expression, when processing an incoming character from state set 0 to state set 4 or from state set 1 to state set 3, and when the incoming character would normally bring about a transition from any state I–1 to a successor state I with a penalty of zero, the system 100 substitutes an "infinite" (i.e., very large) penalty. In other words, when processing the segments represented by FIGS. 6A–C, the system 100 removes transition 604, thereby effectively replacing the 0 penalty transition with an infinite penalty.

In the above description of exchanged adjacent characters, there are various steps described in which an incoming character is processed from state zero to state two. To implement both support for exchanged adjacent characters and support for one-to-many, many-to-one, and many-to-many character substitution, the handling of one-to-many, many-to-one, and many-to-many character substitutions is done just after the processing of an incoming character from state zero to state two.

For example, suppose that an incoming character has just been processed from state zero to state two as described above with respect to exchanged adjacent characters. Immediately thereafter, one or more character substitution procedures may be applied. Each of these procedures updates state set 2. State set 2 should not be copied back to state set 0, however, until the time specified above during the discussion of exchanged adjacent characters.

Whereas the description so far has been for the case of a single regular expression (e.g., "for"), the case of multiple regular expressions (e.g., "for love") evokes particular techniques, especially as regards the calculation and presentation of overall metric values for individual documents that contain matches to the constituent regular expressions in a compound search expression.

A multiple regular fuzzy search expression is comprised of a set of one or more fuzzy search terms. Each fuzzy search term in the search expression is associated with several possible found words. Those found words are strings in the target document set which are identified by the fuzzy finite-state, non-deterministic automation technique to be "close" to the fuzzy search term. Each found word is given an individual metric value by that process. That metric is a measure of the distance between the found word and its associated fuzzy search term. As explained previously, this found word metric is defined as an accumulated penalty that is accrued as a function of the minimal application of conversion rules from a set of such rules, each of which has its own penalty value.

For each fuzzy search term in the search expression, the user selects zero or more of those found words as being useful in the identification and presentation of documents that contain them. In an alternate embodiment, an algorithm follows a user-established policy to automatically select suitable found words, such as the best N found words for each fuzzy search term. At least one such found word must be selected from the entire set of found words for all the fuzzy search terms in the fuzzy search expression. In another embodiment, at least one such found word must be selected from each specific set of found words for each of the fuzzy search terms in the fuzzy search expression. The required set of selections may also be influenced by logical and other operators that establish desired relations between fuzzy search terms, such as OR, AND, and proximity constraints.

The documents that contain one or more of the selected found words are presented to the user in a list. Each document has instance counts for each found word that is contained in that document. A metric value is assigned to each document to allow the set of documents to be sorted prior to presentation, and to assist the user in evaluating the suitability of each document in that list with respect to the compound search expression.

The user can then select documents from the list for viewing, printing, further searching or other uses.

In a preferred embodiment, the metric that is associated with a document is calculated as a number on the unit interval: [0.0, 1.0]. The calculation of this document metric is based on the individual metric values and instance counts of the constituent found words that are determined to be "close" to the terms in the compound search expression, selected for suitability by the user, and found to be contained in the document. Specifically, the calculation involves six steps. The first step is to convert the penalty values for each found word into a different form via a formula such as:

$$\text{new\_metric} = (1.0/(1.0 + (\text{penalty}/12.0))) \tag{Eq. 3}$$

Thus, a penalty value of zero, which corresponds to an exact match between the fuzzy search term and the found word, becomes a new_metric value of unity. Non-zero penalty values corresponding to inexact matches yield new_metric values closer to zero. Any process which converts a penalty of zero into a value of unity, and larger penalties into values closer to zero is suitable in this step. The constant 12.0 is found to provide reasonable ranges for new_metric values when using suggested penalty values presented in previous examples, but other constants could also be used.

The second step is to record for each document the maximum value of new_metric from the set of new_metric values associated with the set of suitable found words that are in a document. This maximum value is determined for each document, thus recording the new_metric value for the suitable found word in that document that has the closest match with its fuzzy search term. In an alternate embodiment, the maximum value may be the product of the maximum new_metric values for each fuzzy search term in the compound search expression, where only suitable found words that have non-zero instance counts in the particular document are considered, and a default low new_metric type value is used for any fuzzy search term that is not represented by a suitable found word in that particular document. This value will be used as a limiting metric value on the document after normalization, as explained below in connection with the sixth step.

The third step is to combine the new_metric values of the found words with their respective instance counts. For each document, the sum of the products of instance counts times new_metric values for each found word in the document is calculated. In an alternate embodiment, the instance counts may each be incremented by one and a logarithm taken thereof before multiplication by their associated new_metric values.

The fourth step is to determine the maximum value of those sums across the whole set of documents that are under consideration.

The fifth step is to divide each sum by the maximum value determined in the fourth step. This normalizes the sums, so that all the normalized values are on the unit interval.

The sixth and final step is to multiply all the normalized sums by the maximum new_metric value of the document that has the largest normalized sum (that sum is necessarily of value unity for that document).

The description above has concerned searching text documents. Fuzzy finite non-deterministic state automata as described herein also may be applied to locate best matches in other environments as well, such as a mathematical search tree. For example, a fuzzy finite non-deterministic automation may be applied to a depth-first tree search in a generalized optimization problem.

It should also be recognized that just as the weights discussed above in connection with FIGS. 2A and 2B may be adaptively modified, so may penalty values associated with transition rules, e.g., 401.

Other Applications. The present invention may be used in a number of other systems, such as a dictionary, spelling checker, foreign language lookup system, citation lookup system, and the like.

In a dictionary application, the user could supply a word or search expression and the target words would be the word entries in the dictionary. The automation would then be used to locate the word entries in the dictionary that most closely match the entered word or search expression. The user could then select the word entries of interest and be shown the definitions of the selected word entries from the dictionary.

In another embodiment of a dictionary, the user could supply a word or search expression, and the target words would be all the words appearing in the dictionary as word entries, definitions, and parts of definitions. The automation would then be used to locate the target words that most closely match the entered word or search expression. The user could then make a selection from the closely matching target words and be shown the textual context in which the target word appeared in the dictionary, typically an entry word, together with the definition of the entry.

In a spelling checker, the user could enter a word or search expression and the target words would consist of a set of words known to be spelled correctly. The automation would then be used to locate the words in the set that most closely match the entered word or search expression.

In another embodiment of a spelling checker, the search expressions would consist of the words contained in a document whose words were to be spell checked.

In a foreign language lookup system, the user would supply a word or search expression in a first language and the target words would correspond to word entries in the first language in the foreign language dictionary. The automation would then be used to locate the entries in the dictionary that most closely match the entered word or search expression. The user could then select the entries of interest and be shown the corresponding words in a second language.

There are many other search situations in which the present invention may be used to locate closely matching text in collections of documents.

It should also be recognized that fuzzy finite-state non-deterministic automata may be used to detect not only character strings, but also other kinds of symbolic data. A similar symbol examination may be used in other applications, such as the identification of tokens in a computer program. In a software compiler, for example, when a particular token has been found to be inappropriate, the compeiler could use the services of a fuzzy finite-state non-deterministic automation to choose among the combined set of reserved words used in the programming language and the set of tokens used in the rest of the program to determine a probable replacement token.

The automation may also receive target data from a measuring device, such as a sphygmomanometer, or from any other monitoring device. It is expected that, in such applications, the input would typically consist of a string of numbers, rather than a string of characters. The search expression would also consist of a string of numbers. In one embodiment, the penalty associated with replacing a number in the incoming string with a number from the search expression would be the absolute value of the difference between the numbers. Penalties for the insertion and deletion of numbers into the target string would correspond to stretching or compressing the target string.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for selectively retrieving information, including a plurality of stored target strings contained in a document set stored on a data storage medium and accessible by a computer processor, the method comprising the steps of:

transmitting a search expression to the processor;

constructing a linear finite-state non-deterministic automation corresponding to the search expression wherein the automation permits transitions only from a state to itself and from the state to a next state and wherein a linear finite-state non-deterministic automation is constructed for any transmitted search expression;

applying the plurality of target strings to the automation and generating thereby a dissimilarity metric for each target string; and producing a list of matching target strings based upon a true dissimilarity metric of each target string.

2. The method of claim 1, wherein the applying step terminates application of a particular target string to the automation in response to the dissimilarity metric for the particular target string achieving a maximum dissimilarity threshold value.

3. The method of claim 1, wherein the applying step terminates application of a particular target string to the automation in response to the dissimilarity metric for the particular target string exceeding a dissimilarity metric of a previously applied target string.

4. The method of claim 1, further comprising the substeps of:

estimating an estimated dissimilarity metric for each of the plurality of target strings from the search expression; and sorting the plurality of target strings by estimated dissimilarity metric in a first order, wherein the target strings are applied to the automation in the first order.

5. The method of claim 4, wherein the estimating step comprises the substeps of:

sorting search characters for which the search expression searches in a second order;

sorting target characters from each of the plurality of target strings in the second order; and determining a prematch score from the sorted search characters and the sorted target characters.

6. The method of claim 5, wherein the second order is ASCII order.

7. The method of claim 5, wherein the prematch score is the sum of:

a number of the target characters that are different than the search characters, multiplied by a standard character deletion penalty; and a number of the search characters that are different than the target characters, multiplied by a standard character insertion penalty.

8. The method of claim 1, wherein the constructing step comprises the substeps of:

breaking the search expression into one or more segments;

identifying a syntax category for each of the one or more segments; and inserting one or more transitions corresponding to each identified syntax category into the linear finite-state non-deterministic automation.

9. The method of claim 8, wherein the breaking, identifying, and inserting substeps are performed by a deterministic automation.

10. The method of claim 8, wherein each of the one or more transitions applies a penalty value dependent upon a character of the target string being applied to the linear finite-state non-deterministic automation.

11. The method of claim 1, wherein the applying step comprises the substeps of:

initializing the automation by assigning a value to each state in the automation dependent upon a location of each state in the automation and a standard insertion penalty, and assigning a state following an exact transition and all subsequent states an infinite value;

processing each character of the target string being applied with the initialized automation; and retrieving the true dissimilarity metric from the automation.

12. The method of claim 1, wherein the applying step comprises the substep of:

applying one or more transition rules allowing one-to-one fuzzy character substitution.

13. The method of claim 1, wherein the applying step comprises the substep of:

applying one or more transition rules allowing exchanged adjacent characters.

14. The method of claim 1, wherein the applying step comprises the substep of:

applying one or more transition rules allowing one-to-many, many-to-one, and many-to-many fuzzy character substitutions.

15. The method of claim 1, wherein the producing step produces N-best matching target strings and further comprises the step of:

storing the N-best matching target strings ranked by the true dissimilarity metric of each target string.

16. The method of claim 15, wherein the N-best matching target strings are held in a priority queue.

17. The method of claim 1, wherein the search expression is a generalized regular expression.

18. The method of claim 1, wherein the search expression allows for fuzzy searching, exact searching, and multiple character specification.

19. A computer system for selectively retrieving information, including a plurality of stored target strings contained in a document set stored on a data storage medium and accessible by a computer processor, the system comprising:

a data input device providing a user-defined search expression to the processor;

a finite-state deterministic automation adapted for receiving the search expression and generating a linear finite-state non-deterministic automation therefrom adapted to accept as input each distinct stored target string and to produce in response a dissimilarity metric associated with each distinct stored target string; and an output device producing a subset of the distinct stored text strings based upon the dissimilarity metrics.

20. The system of claim 19, wherein the dissimilarity metric produced by the fuzzy finite-state non-deterministic automation accounts for fuzzy exchange of adjacent characters in the target string.

21. The system of claim 19, wherein the dissimilarity metric produced by the fuzzy finite-state non-deterministic automation accounts for fuzzy one-to-one character exchange.

22. The system of claim 19, wherein the dissimilarity metric produced by the fuzzy finite-state non-deterministic automation accounts for one-to-many, many-to-one, and many-to-many fuzzy character substitutions in the target string.

23. The system of claim 19, wherein the finite-state deterministic automation parses the received search expression into one or more segments and wherein each segment corresponds to a set of transitions in the fuzzy finite-state non-deterministic automation.

24. The system of claim 23, wherein the correspondence between a particular segment and the set of transitions is determined by whether the particular segment is fuzzy, whether the particular segment contains a wild card, and whether the particular segment includes a quantifier.

25. The system of claim 19, further comprising:

a prematching module for:

extracting one or more search characters from the search expression;

extracting one or more target characters from each distinct target string; and estimating an estimated dissimilarity metric for each distinct target string from the one or more search characters and the one or more target characters.

26. The system of claim 25, wherein the prematch module sorts the target strings by estimated dissimilarity metric and wherein the fuzzy finite-state non-deterministic automation accepts as input the sorted target strings.

27. The system of claim 19, wherein the search expression searches for the N-best matching target strings, the system fiurther comprising:

a priority module for holding in order the distinct target strings processed by the fuzzy finite-state non-deterministic automation having the N-lowest dissimilarity metrics.

28. The system of claim 19, wherein the search expression is a generalized regular expression.

29. The system of claim 28, wherein the search expression is comprised of one or more segments and at least one of the segments specifies multiple characters.

30. A computer-program method for selectively retrieving information, including a plurality of stored target strings contained in a document set stored on a data storage medium and accessible by a computer processor, the method comprising the steps of:

transmitting a search expression to the processor;

sorting the plurality of stored target strings by an estimated dissimilarity metric;

constructing a linear finite-state non-deterministic automation corresponding to the search expression;

applying the sorted target strings to the automation and generating thereby a true dissimilarity metric for each target string, wherein the true dissimilarity metric reflects predetermined differences between each target string and the search expression including:

one-to-one fuzzy character substitutions;

exchanged adjacent characters; and one-to-many, many-to-one, and many-to-many character substitutions; and storing target strings having the N-lowest true dissimilarity metrics in an N-item data structure.

31. The method of claim 30, further comprising the substep of:

terminating the application of one of the target strings to the automation when a true dissimilarity metric associated with the one of the target strings exceeds a maximum dissimilarity value.

32. The method of claim 30, further comprising the substep of:

terminating the application of one of the target strings to the automation when a true dissimilarity metric associated with the one of the target strings exceeds a dissimilarity metric of a previously applied target string.

* * * * *

UNITED STATES PATENT AND TRADEMARK OFFICE
CERTIFICATE OF CORRECTION

PATENT NO.  : 6,018,735
DATED       : January 25, 2000
INVENTOR(S) : Kenneth M. Hunter It is certified that error appears in the above-identified patent and that said Letters Patent is hereby corrected as shown below:

In the abstract, specification, and claims, change every instance of the word "automation" to --automaton--;

Claim 16, after "queue" add --such that the N-th best matching target string can be readily determined--.

Title page, item [57], line 11, change the word "fizzy" to --fuzzy--.

Signed and Sealed this

Twenty-eighth Day of November, 2000

Attest:

Q. TODD DICKINSON

*Attesting Officer*        *Director of Patents and Trademarks*